US006410666B1

(12) United States Patent
Grubbs et al.

(10) Patent No.: US 6,410,666 B1
(45) Date of Patent: Jun. 25, 2002

(54) ABA TRIBLOCK AND DIBLOCK COPOLYMERS AND METHODS OF PREPARING THE SAME

(75) Inventors: Robert H. Grubbs, South Pasadena; Christopher W. Bielawski, Pasadena, both of CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 09/527,757

(22) Filed: Mar. 17, 2000

Related U.S. Application Data
(60) Provisional application No. 60/124,915, filed on Mar. 18, 1999.

(51) Int. Cl.[7] .............................. C08F 4/44; C08F 20/10; C08F 16/34; C08F 12/06

(52) U.S. Cl. ..................... 526/171; 526/172; 526/308; 526/319; 526/281; 526/296; 526/303.1; 526/315; 526/317.1; 526/336; 526/347; 525/326.1; 525/360; 525/367; 525/371

(58) Field of Search ................................. 526/172, 171, 526/348.6, 92, 308, 309, 319, 281, 296, 303.1, 315, 317.1, 336, 347; 525/326.1, 360, 367, 371

(56) References Cited

U.S. PATENT DOCUMENTS

| | | | |
|---|---|---|---|
| 5,312,940 A | | 5/1994 | Grubbs et al. ............... 556/136 |
| 5,342,909 A | | 8/1994 | Grubbs et al. ............... 526/171 |
| 5,621,047 A | | 4/1997 | Nubel et al. .................. 525/247 |
| 5,710,298 A | | 1/1998 | Grubbs et al. ................. 556/22 |
| 5,750,815 A | * | 5/1998 | Grubbs et al. ............... 585/511 |
| 5,807,937 A | * | 9/1998 | Matyjaszewski et al. ... 526/135 |
| 5,831,108 A | | 11/1998 | Grubbs et al. ................. 556/21 |
| 5,880,231 A | | 3/1999 | Grubbs et al. ............... 526/171 |

FOREIGN PATENT DOCUMENTS

WO  WO 98/21214  5/1998 ............. C07F/9/02

* cited by examiner

*Primary Examiner*—David W. Wu
*Assistant Examiner*—R. Harlan
(74) *Attorney, Agent, or Firm*—Pillsbury Winthrop LLP

(57) ABSTRACT

The invention discloses a method for preparing a tri block copolymer of the formula:

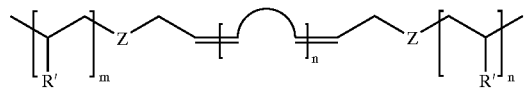

comprising:
(a) contacting a cycloalkene with a chain transfer agent of the formula:

Z—Y=Y—Z in the presence of a metal carbene metathesis catalyst to form a telechelic polymer; and
(d) contacting the telechelic polymer with an alkene of the formula

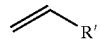

in the presence of an ATRP organometallic catalyst wherein n and m are integers; Z is an ATRP initiator and —Y=Y— is an alkenyl group; and, R' is selected from the group consisting of aryl, nitrile and $C_1$–$C_{20}$ carboxylate, wherein R' is substituted or unsubstituted. The invention also discloses a method for preparing a diblock copolymer. In addition, the invention encompasses a triblock copolymer having no 1,2-PBD structure in the PBD portion of the copolymer.

29 Claims, 6 Drawing Sheets

ABA TRIBLOCK AND DIBLOCK COPOLYMERS AND METHODS OF PREPARING THE SAME

This application claims the benefit of U.S. Provisional Patent Application Ser. No. 60/124,915, filed Mar. 18, 1999, the contents of which are herein incorporated by reference in its entirety.

The U.S. Government has certain rights in this invention pursuant to Grant No. 9509745 awarded by the National Science Foundation.

BACKGROUND

Recently, great attention has been directed toward the synthesis of ABA triblock copolymers that function as thermoplastic elastomers. These materials are composed of long blocks of different homopolymers possessing incompatible aggregation behavior. Generally, two blocks are structurally rigid and dispersed in the form of minute glassy domains in a third block, usually a flexible polymer possessing an amorphous, rubbery phase. For example, FIG. 1 shows a schematic representation of the microphase behavior of SBS triblock copolymers, showing areas of aggregation of the glassy poly(styrene) blocks, dispersed in the amorphous poly(butadiene) chains. The glassy regions serve as anchors that hold the soft, elastomeric domains together in a network structure and effectively behave as crosslink points, eliminating the need to vulcanize the material. Heating thermoplastic materials above the melting ("$T_m$") or glass transition temperature ("$T_g$") of the "hard" blocks softens the glassy domains and allows the copolymer to flow; while cooling returns the phase separation and the material again behaves as a crosslinked elastomer.

Poly(styrene)-b-poly(butadiene)-b-poly(styrene) ("SBS") triblock copolymers are well-known thermoplastic elastomers. While their tensile strength properties are similar to that of natural rubber, they are dependent on a high degree of 1,4- over 1,2-poly(butadiene) chain microstructure for optimal elastomeric behavior.

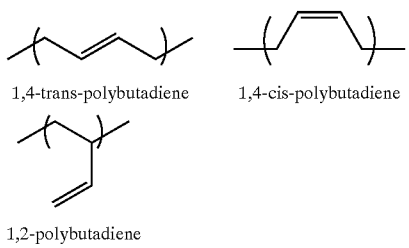

1,4-trans-polybutadiene   1,4-cis-polybutadiene 1,2-polybutadiene

The most common synthesis of SBS involves a sequential addition anionic polymerization method (Scheme 1), which inherently introduces varying degrees of 1,2-poly(butadiene) content into the polymer backbone.

Scheme 1

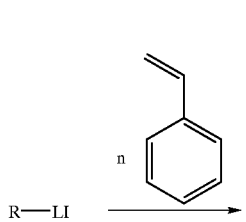

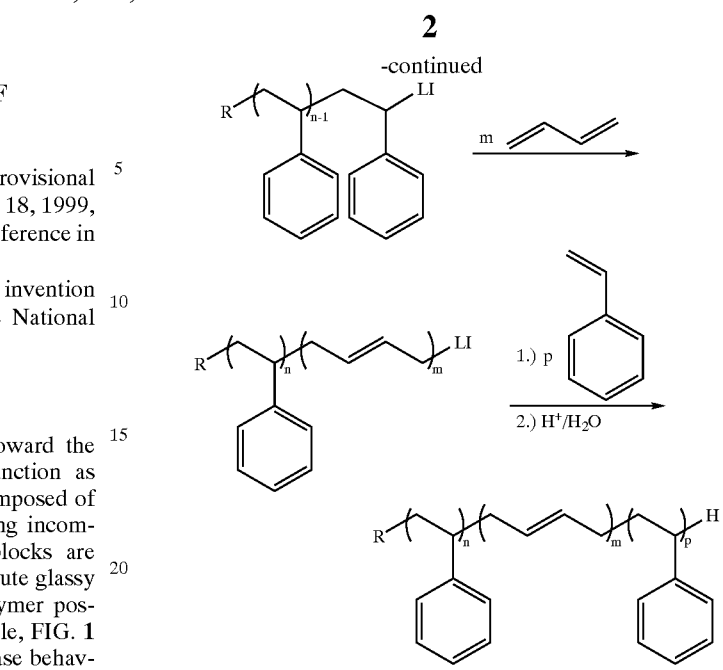

The useful service temperature range of SBS triblock copolymers is ultimately determined by the melting temperature of the poly(styrene) ("PS") domains. It has been shown that the strength of these SBS polymers drops sharply above 60° C. as the $T_g$ of the PS domains is approached. The use of end-blocks with a higher thermal resistance might provide a valuable answer to this problem. A potential candidate is poly(methyl methacrylate) ("PMMA") since it exhibits a $T_g$ of ca. 130° C. (when its syndiotactic content reaches 80%).

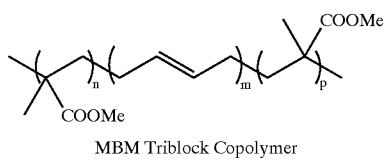

MBM Triblock Copolymer

Unfortunately, the synthesis of poly(methyl methacrylate)-b-poly(butadiene)-b-poly(methyl methacrylate) ("MBM") triblock copolymers is not as straightforward as SBS. A key problem is the inability of poly(methyl methacrylate) anions to initiate the polymerization of butadiene. Since butadiene anions are sufficiently nucleophilic enough to react with methyl methacrylate, attention has been directed towards the synthesis and use of difunctional initiators. However, this has resulted in marginal success and only recently have well-defined MBM triblock copolymers been synthesized. Unfortunately, these copolymers display a high content 1,2-poly(butadiene) microstructure content (>45%) and thus exhibit poor elastomeric properties.

As a result, a need exists for a synthetic methods which would allow the synthesis of such ABA triblock copolymers such as poly(methyl methacrylate)-b-poly(butadiene)-b-poly(methyl methacrylate) which exhibit good elastomeric properties.

SUMMARY

The present invention relates to novel ABA triblock co-polymers that function as thermoplastic elastomers and methods for preparing the same. In general, the inventive ABA triblock polymers are prepared using a ring opening metathesis polymerization ("ROMP") reaction followed by an atom transfer radical polymerization ("ATRP") reaction. As it will be further disclosed below, this tandem approach allows for the synthesis of novel ABA triblock polymers which were not previously possible using prior art techniques. Briefly, ROMP is used to synthesize a telechelic polymer with end groups which function as ATRP initiators in the following manner:

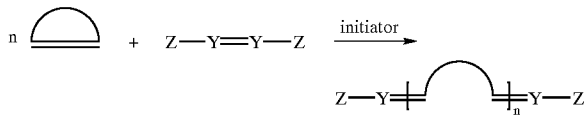

wherein:
n is an integer;

is a cycloalkene;
Z—Y=Y—Z is a chain transfer agent wherein Z is a end group which functions as a ATRP initiator and —Y=Y— is an alkenyl group; and,

is the resulting telechelic polymer.

The ROMP reaction is followed by a ATRP reaction wherein the ROMP telechelic polymer product is further polymerized in the following manner:

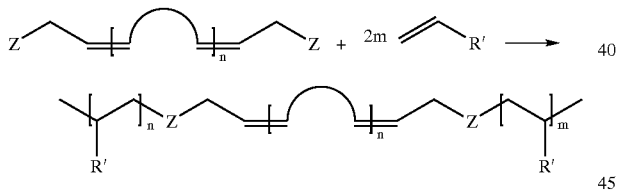

wherein:
m is an integer;

is an alkene; and

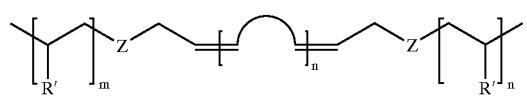

is the resulting ABA copolymer.

DETAILED DESCRIPTION OF THE PREFERRED EMBODIMENTS

Figure 1:
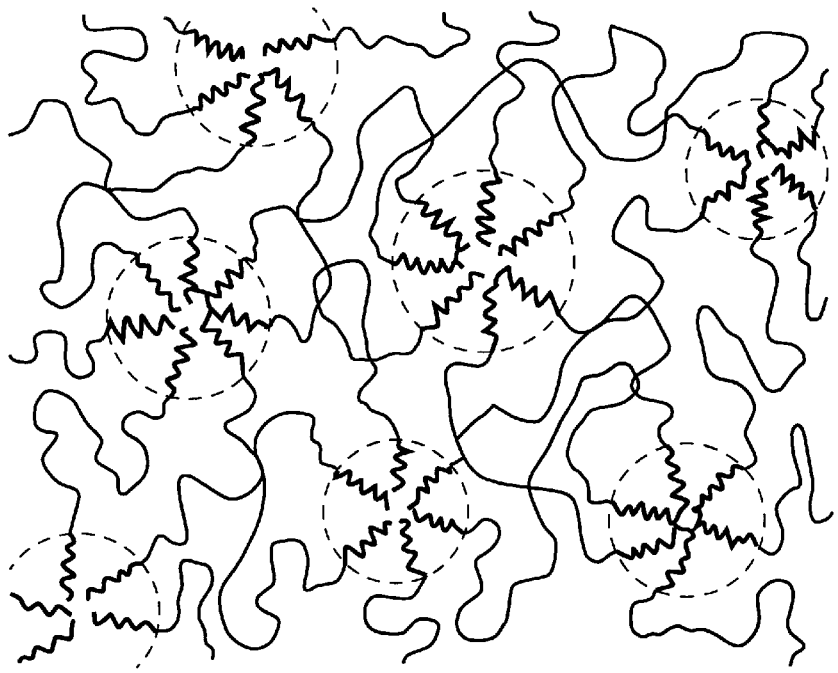
FIG. 1 is a schematic representation of the microphase behavior of SBS triblock copolymers showing areas of aggregation of the glassy PS blocks dispersed in the amorphous PBD chains.

The present invention relates to novel ABA triblock co-polymers that function as thermoplastic elastomers and methods for preparing the same. In general, the inventive ABA triblock polymers are prepared using ring opening metathesis polymerization ("ROMP") reaction followed by atom transfer radical polymerization ("ATRP") reaction. This tandem approach allows for the synthesis of novel ABA triblock polymers which were not previously possible using conventional techniques.

Atom Transfer Radical Polymerization ("ATRP")

One of the most successful strategies for controlled free radical polymerization is ATRP, first reported independently by Sawarnato and Matyjaszewski. The mechanism of ATRP is outlined in Scheme 2 and is based on a reversible, metal mediated halide exchange process.

SCHEME 2

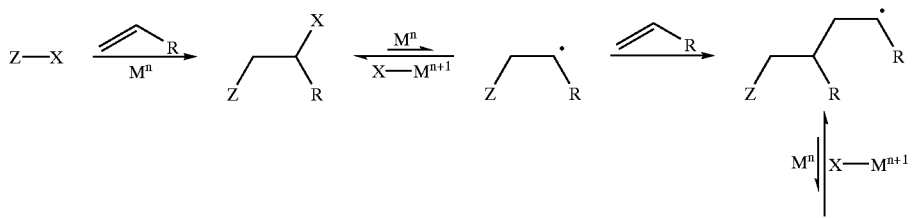

Representative initiators (Z—X)

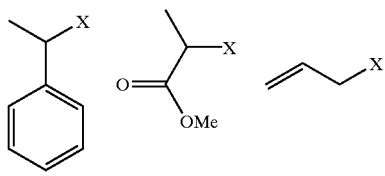

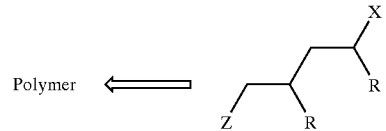

Typical Monomers

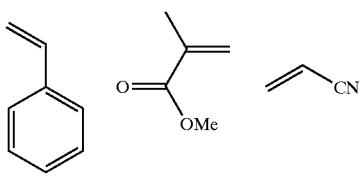

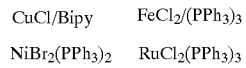

Organometallic Catalysts ($M^n$)

CuCl/Bipy    $FeCl_2/(PPh_3)_3$ $NiBr_2(PPh_3)_2$    $RuCl_2(PPh_3)_3$

Control is achieved because the relative rates of activation and deactivation (i.e., the equilibrium constant) is on the order of $10^{-7}$. Thus, the concentration of growing radicals is sufficiently low (ca. $10^{-8}$ M) to effectively eliminate bimolecular termination. PS and PMMA with pre-determined molecular weights and low (1.05 to 1.50) polydispersity indices ("PDIs") have been obtained using ATRP. Copper chloride and 2,2'-bipyridine ("bipy") are often employed as the organometallic catalyst in these polymerizations.

Thermoplastic elastomers using n-butyl acrylate, methyl acrylate, or 2-ethylhexyl acrylate as the soft B block with styrene, methyl methacrylate, or acrylonitrile comprising the hard A blocks have been prepared. Typically, difunctional ATRP initiators were used to synthesize the central B block, followed by addition of a second monomer to form the two A blocks. Unfortunately, the elastomeric properties of these copolymers have been relatively inferior to SBS or MBM copolymers. Due to the instability of the butadiene radical, SBS, MBM or any poly(butadiene) containing block copolymer may not be readily synthesized using this method.

In an effort to overcome this limitation, there have been attempts to integrate ATRP with other polymerization methods. For example, Scheme 3 illustrates one such approach.

SCHEME 3

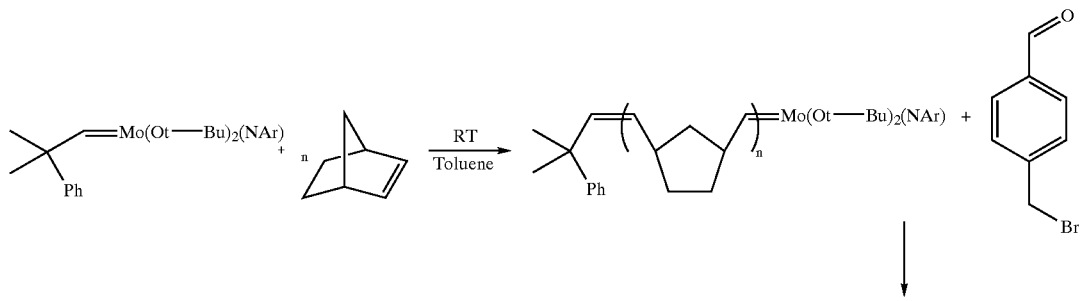

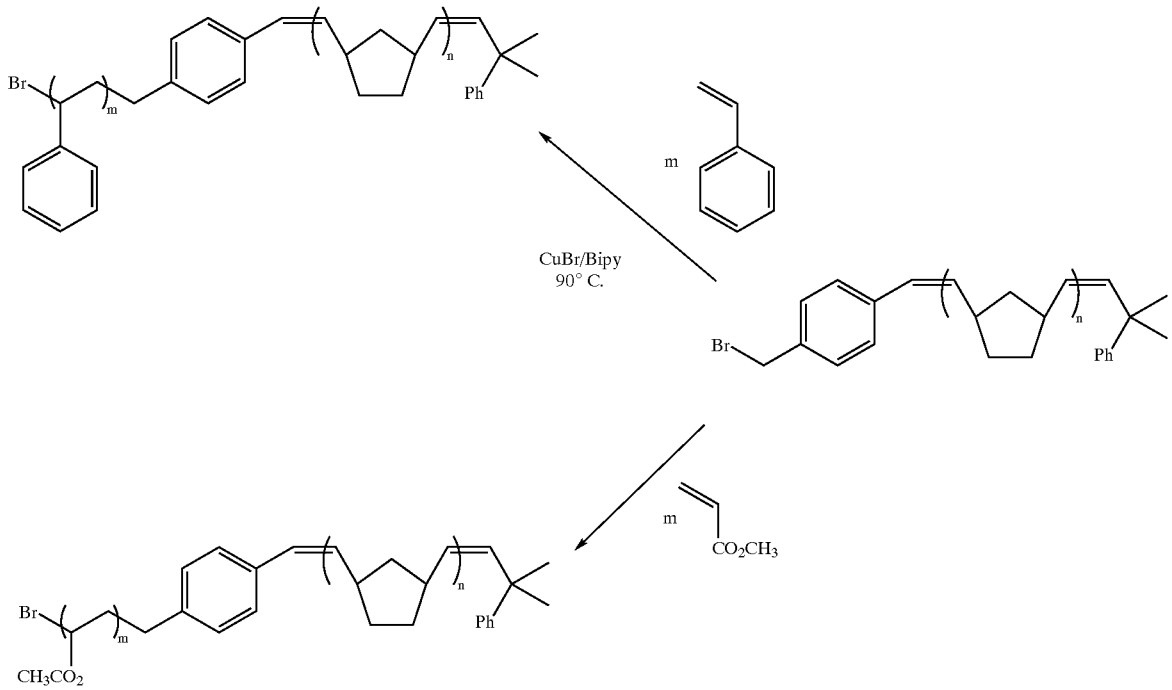

30

Although this approach was successful for preparing diblock copolymers such as poly(styrene)-b-poly(norbornene) and poly(methyl acrylate)-b-poly(norbornene), the synthesis of triblock copolymers requires a polymer with initiating groups on both ends.

Telechelic Polymers via Ring-Opening Metathesis Polymerization (ROMP)

Telechelic polymers are polymers that possess functional end-groups capable of further reactivity. One versatile approach to the synthesis of telechelic polymers involves the ROMP of a cyclic olefin monomer in the presence of an acyclic functionalized alkene that behaves as a chain transfer agent ("CTA"). The general mechanism for this process is outlined in Scheme 4.

SCHEME 4

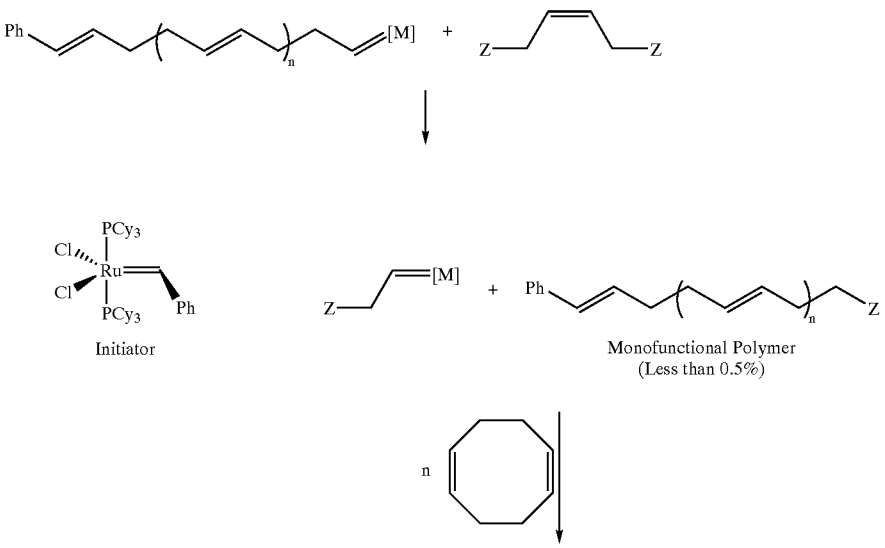

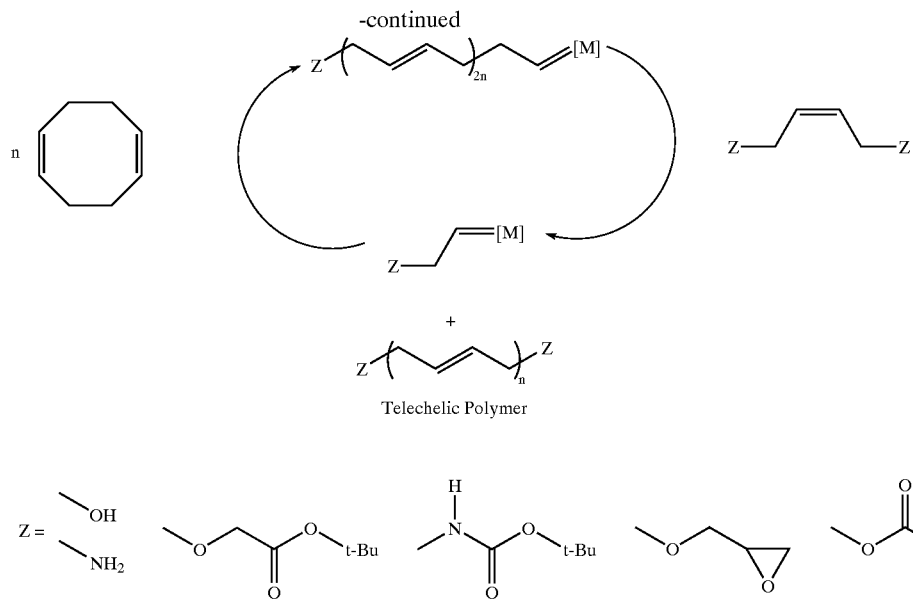

Telechelic Polymer

Propagating polymer chains react with a CTA that effectively transfers the active growing species. This results in a polymeric chain and a new metal carbene each containing a functional group from the CTA. The new metal carbene can then react with either monomer (producing a new polymer chain) or a preformed polymer chain (transferring the active species). The only polymer endgroups that do not contain functional groups originating from the CTA are those from the initiating metal carbene and the terminating agent, which in principle, can be chosen to match those of the CTA. In absence of any termination reactions, the number of active centers is preserved, and can lead to telechelic polymers with a number averaged degree of functionality ("$F_n$") that approaches 2.0.

The combination of ruthenium-based ROMP initiators and a variety of CTA's have resulted in the synthesis of a large number of telechelic polymers (Scheme 4).

Tandem ROMP-ATRP Approach

The present invention combines ROMP and ATRP in a novel strategy for the synthesis of copolymers, in particular triblock and diblock copolymers. In general, ROMP is used to synthesized a telechelic polymer with end groups which function as ATRP initiators in the following manner:

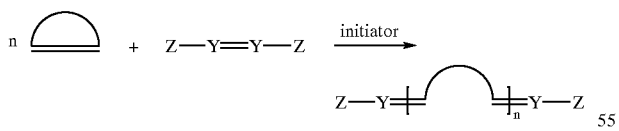

wherein:
 n is an integer;

is a cycloalkene;
 Z—Y=Y—Z is a chain transfer agent wherein Z is a end group which functions as a ATRP initiator and —Y=Y— is an alkenyl group; and,

is the resulting telechelic polymer.

The ROMP reaction is followed by a ATRP reaction wherein the ROMP telechelic polymer product is further polymerized in the following manner:

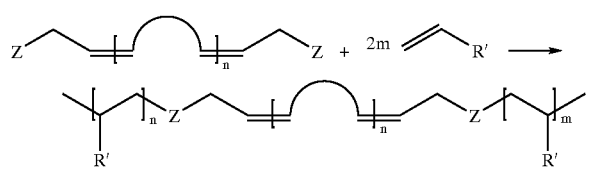

wherein:
 m is an integer;

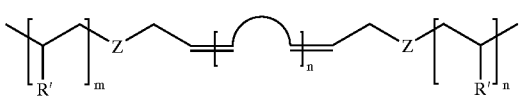

is an alkene; and

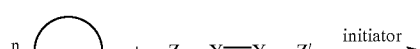

is the resulting ABA copolymer.

Similarly, a diblock copolymer can be synthesized by changing one of the Z groups to a Z' group, where Z' does not act as an ATRP initiator. In general, ROMP is used to synthesized a telechelic polymer with only one end group which functions as ATRP initiator in the following manner:

wherein:
n is an integer;

is a cycloalkene;

Z—Y=Y—Z' is a chain transfer agent wherein Z is a end group which functions as a ATRP initiator and —Y=Y— is an alkenyl group; and,

is the resulting telechelic polymer.

The ROMP reaction is followed by a ATRP reaction wherein the ROMP telechelic polymer product is further polymerized in the following manner:

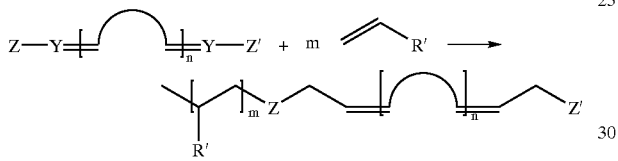

wherein:
m is an integer;

is an alkene; and

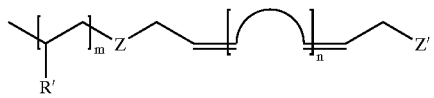

is the resulting diblock copolymer.

In these cases, Z' can be any group that does not function as an ATRP initiator. For example, Z' can be a moiety selected from the group consisting of hydrogen or one of the following substituent groups: $C_1$–$C_{20}$ alkyl, $C_2$–$C_{20}$ alkenyl, $C_2$–$C_{20}$ alkynyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl and $C_1$–$C_{20}$ alkylsulfinyl. Optionally, the substituent group may be substituted with one or more groups selected from $C_1$–$C_5$ alkyl, $C_1$–$C_5$ alkoxy, and aryl. When the substituent aryl group is phenyl, it may be further substituted with one or more groups selected from a halogen, a $C_1$–$C_5$ alkyl, or a $C_1$–$C_5$ alkoxy. Moreover, Z' may further include one or more functional groups. Examples of suitable functional groups include but are not limited to: hydroxyl, thiol, thioether, ketone, aldehyde, ester, ether, amine, imine, amide, nitro, carboxylic acid, disulfide, carbonate, isocyanate, carbodiimide, carboalkoxy, carbamate, and halogen. Further discussion on this approach can be found in Bielawski, C. W.; Morita, T.; Grubbs, R. H. *Macromolecules* 2000, 33, 678, the contents of which are herein incorporated by reference.

ROMP Initiators

In general, initiators (or catalysts) that may be used in the practice of the present invention are ruthenium or osmium carbene complexes that include a ruthenium or osmium metal center that is in a +2 oxidation state, have an electron count of 16, and are penta-coordinated. More specifically, the initiators are of the formula

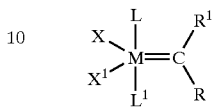

wherein:
M is ruthenium or osmium;
X and $X^1$ are independently any anionic ligand;
L and $L^1$ are any neutral electron donor ligand;
R and $R^1$ are each hydrogen or one of the following substituent groups: $C_1$–$C_{20}$ alkyl, $C_2$–$C_{20}$ alkenyl, $C_2$–$C_{20}$ alkynyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl and $C_1$–$C_{20}$ alkylsulfinyl. Optionally, the substituent group may be substituted with one or more groups selected from $C_1$–$C_5$ alkyl, $C_1$–$C_5$ alkoxy, and aryl. When the substituent aryl group is phenyl, it may be further substituted with one or more groups selected from a halogen, a $C_1$–$C_5$ alkyl, or a $C_1$–$C_5$ alkoxy. Moreover, the initiator may further include one or more functional groups. Examples of suitable functional groups include but are not limited to: hydroxyl, thiol, thioether, ketone, aldehyde, ester, ether, amine, imine, amide, nitro, carboxylic acid, disulfide, carbonate, isocyanate, carbodiimide, carboalkoxy, carbamate, and halogen.

These ruthenium and osmium carbene complexes have been described in U.S. Pat. Nos. 5,312,940, 5,342,909, 5,710,298, and 5,831,108 and PCT Publication No. WO 98/21214, all of which are incorporated herein by reference.

In preferred embodiments of these catalysts, the R substituent is hydrogen and the $R^1$ substituent is selected from the group consisting $C_1$–$C_{20}$ alkyl, $C_2$–$C_{20}$ alkenyl, and aryl. In even more preferred embodiments, the $R^1$ substituent is phenyl or vinyl, optionally substituted with one or more moieties selected from the group consisting of $C_1$–$C_5$ alkyl, $C_1$–$C_5$ alkoxy, phenyl, and a functional group. In especially preferred embodiments, $R^1$ is phenyl or vinyl substituted with one or more moieties selected from the group consisting of chloride, bromide, iodide, fluoride, —$NO_2$, —$NMe_2$, methyl, methoxy and phenyl. In the most preferred embodiments, the $R^1$ substituent is phenyl.

In preferred embodiments of these catalysts, L and $L^1$ are each independently selected from the group consisting of phosphine, sulfonated phosphine, phosphite, phosphinite, phosphonite, arsine, stibine, ether, amine, amide, imine, sulfoxide, carboxyl, nitrosyl, pyridine, and thioether. In more preferred embodiments, L and $L^1$ are each a phosphine of the formula $PR^3R^4R^5$, where $R^3$, $R^4$, and $R^5$ are each independently aryl or $C_1$–$C_{10}$ alkyl, particularly primary alkyl, secondary alkyl or cycloalkyl. In the most preferred embodiments, L and $L^1$ ligands are each selected from the group consisting of —P(cyclohexyl)$_3$, —P(cyclopentyl)$_3$, —P(isopropyl)$_3$, and —P(phenyl)$_3$.

In preferred embodiments of these catalysts, X and $X^1$ are each independently hydrogen, halide, or one of the following groups: $C_1$–$C_{20}$ alkyl, aryl, $C_1$–$C_{20}$ alkoxide, aryloxide, $C_3$–$C_{20}$ alkyldiketonate, aryldiketonate, $C_1$–$C_{20}$ carboxylate, arylsulfonate, $C_1$–$C_{20}$ alkylsulfonate, $C_1$–$C_{20}$ alkylthio, $C_1$–$C_{20}$ alkylsulfonyl, or $C_1$–$C_{20}$ alkylsulfinyl. Optionally, X and $X^1$ may be substituted with one or more moieties selected from the group consisting of $C_1$–$C_{10}$ alkyl, $C_1$–$C_{10}$ alkoxy, and aryl which in turn may each be further substituted with one or more groups selected from halogen, $C_1$–$C_5$ alkyl, $C_1$–$C_5$ alkoxy, and phenyl. In more preferred embodiments, X and $X^1$ are halide, benzoate, $C_1$–$C_5$ carboxylate, $C_1$–$C_5$ alkyl, phenoxy, $C_1$–$C_5$ alkoxy, $C_1$–$C_5$ alkylthio, aryl, and $C_1$–$C_5$ alkyl sulfonate. In even more preferred embodiments, X and $X^1$ are each halide, $CF_3CO_2$, $CH_3CO_2$, $CFH_2CO_2$, $(CH_3)_3CO$, $(CF_3)_2(CH_3)CO$, $(CF_3)(CH_3)_2CO$, PhO, MeO, EtO, tosylate, mesylate, or trifluoromethanesulfonate. In the most preferred embodiments, X and $X^1$ are each chloride.

The most preferred initiators in the practice of the present invention are as described above wherein M is ruthenium; X and $X^1$ are both chloride; L and $L^1$ ligands are both —P(cyclohexyl)$_3$; R is hydrogen; and $R^1$ is either phenyl, (—CH=CPh$_2$), or (CH=C(CH$_3$)$_2$).

The above initiators/catalysts are stable in the presence of a variety of functional groups including hydroxyl, thiol, ketone, aldehyde, ester, ether, amine, imine, amide, nitro, carboxylic acid, disulfide, carbonate, isocyanate, carbodiimide, carboalkoxy, and halogen. Therefore, the starting materials and products of the reactions described below may contain one or more of these functional groups without poisoning the catalyst. In addition, the initiators are stable in the presence of aqueous, organic, or protic solvents, including aromatic hydrocarbons, chlorinated hydrocarbons, ethers, aliphatic hydrocarbons, alcohols, water, or mixtures of the above.

ROMP Cycloalkene

Any cycloalkene (also referred to as cyclic olefin) that can participate in a ring-opening metathesis polymerization ("ROMP") reaction may be used. Because of the generally high metathesis activity of the initiators of the present invention, the cycloalkene may be strained or unstrained. In addition, the cycloalkene may be substituted or unsubstituted and may include one or more substituent groups selected from the group consisting of $C_1$–$C_{20}$ alkyl, $C_2$–$C_{20}$ alkenyl, $C_2$–$C_{20}$ alkynyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl and $C_1$–$C_{20}$ alkylsulfinyl, wherein each of the substituents may be substituted or unsubstituted.

Optionally, the substituent group is substituted with one or more substituted or unsubstituted moieties selected from the group consisting of $C_1$–$C_{10}$ alkyl, $C_1$–$C_{10}$ alkoxy, and aryl. The moiety, in turn, may be substituted with one or more groups selected from the group consisting of halogen, $C_1$–$C_5$ alkyl, $C_1$–$C_5$ alkoxy. Further, the substituent may be functionalized with a moiety selected from the group consisting of hydroxyl, thiol, thioether, ketone, aldehyde, ester, ether, amine, imine, amide, nitro, carboxylic acid, disulfide, carbonate, isocyanate, carbodiimide, carboalkoxy, carbamate, and halogen.

Illustrative examples of suitable cycloalkenes include but are not limited to: norbornene, norbornadiene, cyclopentene, dicyclopentadiene, cyclo-octene, 7-oxanorbornene, 7-oxanorbornadiene, cyclodocene, 1,3-cyclooctadiene, 1,5-cyclooctadiene, 1,3-cycloheptadiene, and derivatives thereof. In preferred embodiments, the cycloalkene is a cycloalkadiene. In more preferred embodiments, the cycloalkene is selected from the group consisting of norbornadiene, dicyclopentadiene, 1,3-cyclo-octadiene, 1,5-cyclo-octadiene, 1,3-cycloheptadiene, and derivatives thereof. The use of 1,5-cyclo-octadiene as the cycloalkene is most preferred.

ROMP Chain Transfer Agent

The chain transfer agent ("CTA") is of the general formula, Z—Y=Y—Z, wherein —Y=Y— is an alkenyl group and Z is any end group which is capable of functioning as an ATRP initiator. In preferred embodiments, —Y=Y— is a $C_2$–$C_{20}$ alkene and Z is either chloride, bromide, allyl chloride, allyl bromide, 2-chloroisobutyrate, 2-bromo isobutyrate, 2-chloro proprionate, 2-bromo proprionate, 2-chloro acetate, 2-bromo acetate, o-, m-, or p-benzyl chloride, o-, m-, or p-benzyl bromide, o-, m-, or p-$C_1$–$C_{20}$ alkyl benzyl chloride, o-, m-, or p-$C_1$–$C_{20}$ alkyl benzyl bromide, p-toluenesulfonyl chloride, p-toluenesulfonyl bromide, trichloromethyl, tribromomethyl, dichloromethyl, and dibromomethyl. There are also several aryl, nitrile, and halogenated related initiators that may be used in the invention. For example, several ATRP initiators that have been discussed in U.S. Pat. Nos. 5,945,491, 5,910,549, 5,807,937, 5,789,487, and 5,763,548 to Matyjaszewski, the contents of which are incorporated herein by reference, may be used in accordance with the invention. ATRP initiators are also listed in Matyjaszewski, Ed; *Controlled Radical Polymerization*, ACS Symposium Series #685, American Chemical Society, Washington D.C. 1998, the contents of which are incorporated herein in their entireties by reference. In more preferred embodiments, Z—Y=Y—Z is 1,4-dichloro-cis-2-butene, bis(2-bromo isobutryate), or bis(2-bromo proprionate).

ATRP Organometallic Catalysts

Any suitable organometallic catalysts may be used in the practice of the present invention. Preferably, the organometallic catalyst follows the general formula of $MX_pL_q$ where M is ruthenium, copper, iron, or nickel; X is bromide or chloride, and L is selected from the group consisting of phosphine, sulfonated phosphine, phosphite, phosphinite, phosphonite, arsine, stibine, ether, amine, amide, imine, sulfoxide, carboxyl, nitrosyl, pyridine, and thioether; and wherein p and q are integers. In addition, L may be a phosphine of the formula $PR^3R^4R^5$, where $R^3$, $R^4$, and $R^5$ are each independently aryl or $C_1$–$C_{10}$ alkyl, particularly primary alkyl, secondary alkyl or cycloalkyl. For example, L may be selected from the group consisting of —P(cyclohexyl)$_3$, —P(cyclopentyl)$_3$, —P(isopropyl)$_3$, and —P(phenyl)$_3$.

Illustrative examples of suitable catalysts include but are not limited to: CuCl/bipy; CuBr/bipy, CuCl/4-4'-di-n-heptyl-2,2'-bipyridine; CuBr/4-4'-di-n-heptyl-2,2'-bipyridine; FeCl$_2$/(PPh$_3$)$_3$; RuCl$_2$(PPh$_3$)$_3$; NiBr$_2$(PPh$_3$)$_2$; NiBr$_2$(Pn-Bu$_3$)$_2$, FeBr$_2$(Pn-Bu$_3$)$_2$, RuBr$_2$(Pn-Bu$_3$)$_2$. Other preferable examples include CuCl/tris[2-dimethylamino) ethyl]amine, CuBr/tris[2-dimethylamino)ethyl]amine, CuCl/1,4,8,11-tetramethyl-1,4,8-tetracyclotetradecane, CuBr/1,4,8,11-tetramethyl-1,4,8-tetracyclotetradecane, CuCl/N,N-bis(2-pyridylmethyl)octylamine, CuBr/ N,N-bis (2-pyridylmethyl)octylamine, CuCl/tris[(2-pyridyl)methyl] amine, CuBr/tris[(2-pyridyl)methyl]amine, CuCl/N,N,N',N', N'-pentamethyidiethylenetriamine, CuBr/N,N,N',N',N'-pentamethyldiethylenetriamine, CuCl/1,1,4,7,10,10-hexamethyltriethylenetetraamine, CuBr/1,1,4,7,10,10-hexamethyltriethylenetetraamine, CuCl/ tetramethylethylenediamine, and CuBr/ tetramethylethylenediamine. Other catalysts that may be used in accordance with the invention can be seen in *Macromolecules*, 1998, 31, 5958–5959; Mircea and Matyjaszewski, *Macromolecules*, 2000; *Macromolecules*, 1999, 32, 2434–2437, the contents of each of which are incorporated herein by reference. Because triblock and diblock polymers with predictable molecular weights and low polydispersity were consistently synthesized using these systems, the use of CuCl/bipy or CuCl/4-4'-di-n-heptyl-2, 2'-bipyridine is especially preferred.

Metal Carbene Metathesis Catalyst Used for Both ROMP and ATRP

Another aspect of the invention provides for the synthesis of triblock copolymers without the use of an additional ATRP organometallic catalyst. In other words, while the tandem ROMP/ATRP approach discussed above would be followed, no additional ATRP organometallic catalyst is used. Recently, it has been shown that catalysts effective for ROMP are also effective for ATRP. Thus, at the conclusion of the ROMP reaction, no additional catalyst would be added to initiate the ATRP.

Ethyl vinyl ether has been shown to be a reagent useful in the termination of ROMP reactions. Particularly preferred is the ROMP catalyst formed for use in ATRP after a vinyl ether is added to terminate the ROMP. In the example shown below, the ethyl vinyl ether reacts with the metal carbene initiator (or any derivative thereof, where R is hydrogen and $R^1$ is phenyl or any polymer chain) and forms a new metal species ($R^2$ is —OEt). While the new species is inactive in ROMP, it is active in ATRP. Thus, in the synthesis of triblock copolymers described above, at any given point during the ROMP reaction, ethyl vinyl ether can be added to terminate the ROMP reaction. Once the ATRP monomer is added, ATRP is initiated and catalyzed by this new species

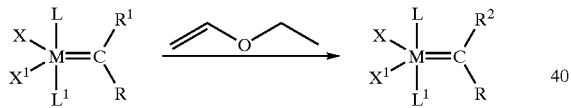

Further discussion on using metathesis catalysts as ATRP catalysts can be found in, for example, Simal, F.; Demonceau, A.; Noels A. F. *Tetrahedon Lett.* 1999, 40, 5689 and Simal, F.; Demonceau, A.; Noels A. F. *Angew Chem* 1999, 38, 538, the contents of both of which are herein incorporated by reference in their entireties.

ATRP Monomer

The ATRP monomer,

may be any suitable alkene (also referred to as an olefin) wherein R' is an aryl or nitrile or $C_1$–$C_{20}$ carboxylate optionally substituted with one or more substituents such as $C_1$–$C_5$ alkyl, $C_1$–$C_5$ alkoxy, and aryl. When the substituent aryl group is phenyl, it may be further substituted with one or more groups selected from a halogen, a $C_1$–$C_5$ alkyl, or a $C_1$–$C_5$ alkoxy. Moreover, the ATRP monomer may further include one or more functional groups. Examples of suitable functional groups include but are not limited to: hydroxyl, thiol, thioether, ketone, aldehyde, ester, ether, amine, imine, amide, nitro, carboxylic acid, disulfide, carbonate, isocyanate, carbodiimide, carboalkoxy, carbamate, and halogen. Illustrative examples of suitable monomers include styrene, methyl methacrylate, n-butyl acrylate, methyl acrylate, 2-ethylhexyl acrylate, acrylonitrile, 4-vinylpyridine and glycidyl acrylate. Because the ATRP polymerization is typically used to synthesize the more structurally rigid polymer portions, the use of monomers such as styrene, methyl methacrylate and acrylonitrile is generally preferred.

Practice of the present invention generally results in a ABA triblock copolymer of the general formula

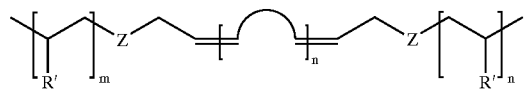

wherein n, m, R', and Z are as previously defined. The inventive synthetic method is surprisingly robust and typically may be synthesized in a one pot method. Even copolymers such as poly(methyl methacrylate)-b-poly(butadiene)-b-poly(methyl methacrylate) may be readily synthesized. Scheme 5 illustrates one preferred embodiment of the inventive method.

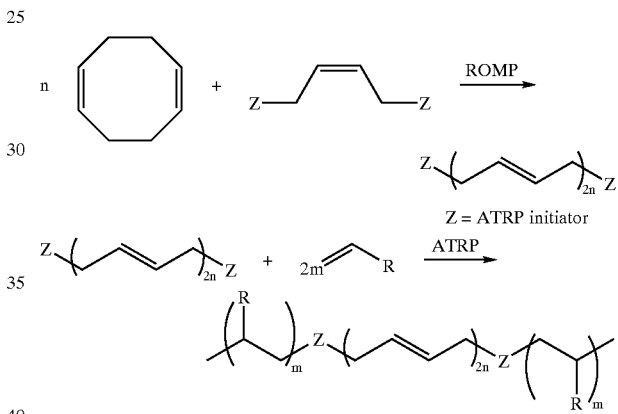

In another surprising and unexpected result, the inventive synthetic methods for the B portion of the copolymer results in a predominantly linear polymer. For example, when cyclo-octadiene is the ROMP cycloalkene, a perfect 1,4-PBD microstructure is observed. Because of the absence of the 1,2-PBD structure which necessarily results with prior art methods, practice of the present invention will result a copolymers with substantially more uniform properties. In other words, the synthesis of even known triblock copolymers such as SBS or MBM may result in "novel" polymers from the virtual elimination of 1,2 PBD structures in the PDB portion of the resulting product.

For the purposes of clarity, the specific details of the invention will be illustrated with reference to especially preferred embodiments. However, it should be appreciated that these embodiments and the appended experimental protocols are for purposes of illustration only and are not intended to limit the scope of the present invention.

Synthesis and Study of Allyl Chloride End-Capped Telechelic Poly(butadiene)

As shown by Scheme 6, the polymerization of COD in the presence of the commercially available CTA 1,4-dichloro-cis-2-butene 1 resulted in bis(allyl chloride) functionalized telechelic PBD 2.

SCHEME 6

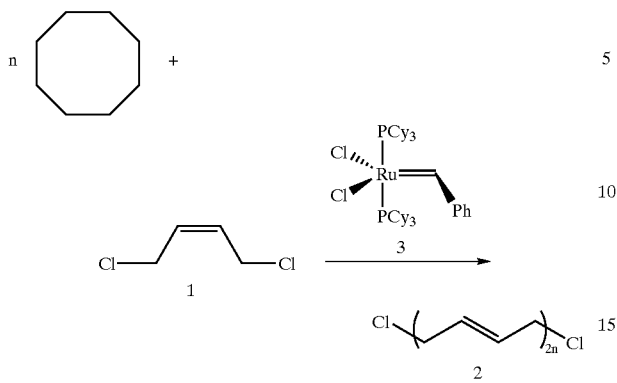

The ring-opening metathesis polymerization were performed in neat COD and were initiated with ruthenium catalyst 3. An initial study of the impact of the COD/CTA ratio, reaction time, and temperature on the polymer yield, molecular weight, and polydispersity is summarized in Table 1. Table 1 lists the results of optimization studies for the ROMP of COD in the presence of bis(allyl chloride) CTA 1.

TABLE 1

| COD/CTA (mol) | Temp (° C.) | Time (h) | Yield (%) | $X_n$ | $M_n$ (GPC) | PDI | % cis |
| --- | --- | --- | --- | --- | --- | --- | --- |
| 5/1 | 25 | 24 | 75 | 21 | 2700 | 1.59 | 66 |
| 5/1 | 25 | 48 | 77 | 20 | 2400 | 1.58 | 66 |
| 5/1 | 40 | 24 | 73 | 20 | 2600 | 1.61 | 66 |
| 50/1 | 25 | 24 | 83 | 90 | 9400 | 1.91 | 63 |
| 100/1 | 25 | 24 | 90 | 145 | 15700 | 2.19 | 63 |

The values for $X_n$ were determined by $^1$H NMR assuming $F_n=2.0$. The $M_n$(GPC) was determined relative to PS standards in THF. The % cis refers to percent cis-olefin geometry found in the PBD, as determined by $^1$H-NMR. Under otherwise identical conditions, reactions at 25° C. gave polymers that showed no significant difference from those obtained at 40° C. In addition, little difference was observed when the reaction time was increased from 24 to 48 hours. The experimental number averaged molecular weights ($M_{n, gpc}$) of the isolated telechelic polymers were determined by gel permeation chromatography ("GPC") and are reported relative to polystyrene standards. While the PDIs of all of the isolated polymers were less than or about 2.0, higher monomer to CTA ratios resulted in more polydisperse samples. This is most likely due to an increased viscosity of the reaction mixture, which is expected to slow or prevent monomer from reacting with growing polymer chains. It may be possible to employ a co-solvent to help alleviate this problem.

Notably, a "perfect" 1,4-PBD microstructure was found in the polymer backbone by $^1$H NMR. This is highly ideal as these types of linkages exhibit optimal elastomeric properties. In addition, the PBD core exhibited about a 66% cis-olefin geometry. Both $^1$H and $^{13}$C NMR support a $F_n$ near 2.0, in accordance with previous results obtained by ROMP using symmetrically disubstituted olefin CTAs.

Synthesis of SBS Triblock Copolymers via ATRP of Telechelic Poly(butadiene) Macroinitiators As illustrated by Scheme 7, telechelic PBD 2 with a $M_n=2400$ was used to initiate the heterogeneous ATRP of styrene in the presence of CuBr/bipy (1/3 molar ratio) at 130° C. under inert atmosphere to form SBS triblock copolymers.

SCHEME 7

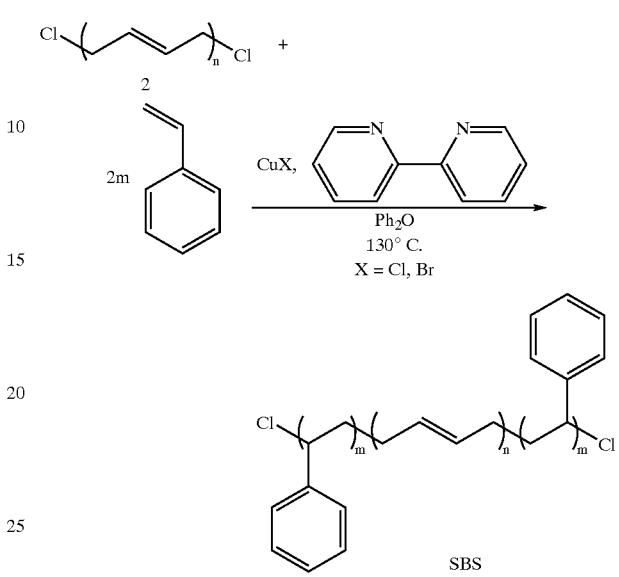

Monomer conversion was monitored by gas chromatography ("GC") using diphenyl ether as the internal standard. After seven hours, the reactions were cooled to room temperature, diluted with tetrahydrofuran ("THF") and then poured into an excess of methanol precipitating a white solid. Occasionally, the isolated polymer was contaminated with a green residue ($Cu^{II}$ salts) which could easily be removed by flash column chromatography using alumina as the solid phase.

TABLE 2

| Entry | $[Sty]_0/[Init]_0$ | $M_{n,theo}$ | $M_{n,gpc}$ | $M_{n,nmr}$ | PDI | % Conv | Yield |
| --- | --- | --- | --- | --- | --- | --- | --- |
| 1 | 20 | 4162 | 4800 | 4300 | 1.48 | 88 | 75 |
| 2 | 40 | 6496 | 7300 | 6900 | 1.45 | 99 | 99 |
| 3 | 80 | 10188 | 10100 | 12300 | 1.45 | 93 | 93 |
| 4 | 120 | 14929 | 13800 | 15900 | 1.52 | 97 | 89 |
| 5 | 180 | 20929 | 18900 | 23700 | 1.74 | 99 | 99 |

Table 2 summarizes the polymerization results for a variety of monomer/initiator ratios. In particular, Table 2 provides data for the synthesis of SBS triblock copolymers via ATRP of styrene using 2 as a macroinitiator. The general conditions for the reaction include: for the initiator/CuBr/bipy is 1/2/6 at 130° C. for 7 hours in Ph$_2$O solvent and N$_2$ atmosphere. The telechelic PBD MW is 2400 and PDI is 1.59. The concentration of the initiator is 50 mM. The $M_{n, theo}$ was calculated based on monomer conversion and assumes $F_n=2.0$. The $M_{n, gpc}$ was determined relative to PS standards in THF. The $M_{n, nmr}$ was determined by $^1$H NMR using a "relative" end-group analysis procedure. The % Conv was determined by GC and the yield was the isolated yield. For entry 5, the reaction was performed in bulk styrene. Good agreement between experimental and theoretical molecular weights (vide infra) indicate that the telechelic PBDs are efficient ATRP initiators, and that the polymerizations are well controlled. Only polymerizations performed in bulk styrene gave a PDI above average (~1.4), presumably due to kinetic effects from the gel-like reaction.

The tandem ROMP-ATRP approach was also used to prepare SBS triblock copolymers with various sizes of the central PBD block. The results are summarized in Table 3.

TABLE 3

| Entry | Time (h) | [Init]$_0$ (mM) | PBD MW | $M_{n,theo}$ | $M_{n,gpc}$ | $M_{n,nmr}$ | PDI | % Conv. |
|---|---|---|---|---|---|---|---|---|
| 1 | 7 | 50 | 2400 | 10188 | 10100 | 12300 | 1.45 | 93 |
| 2 | 9 | 30 | 9900 | 16267 | 13000 | 16900 | 1.94 | 60 |
| 3 | 16 | 15 | 15800 | 20850 | 18900 | 20400 | 2.87 | 54 |

The general conditions for the reaction include: for the initiator/CuBr/bipy is 1/2/6 at 130° C. in Ph$_2$O solvent and N$_2$ atmosphere. The ratio of [styrene]$_o$/[init]$_o$ is 80. The $M_{n, theo}$ was calculated based on monomer conversation and assumes $F_n$=2.0. The $M_{n, gpc}$ was determined relative to PS standards in THF. The $M_{n, nmr}$ was determined by $^1$H NMR using a "relative" end-group analysis procedure. The % Conv was determined by GC. Polydispersity of the SBS triblock copolymers increased with macroinitiator length and may be the result of using telechelic PBD with a $F_n$ less than 2.0. Grubbs and Hillmyer have shown that when synthesizing higher molecular weight telechelic PBDs, the monomer to catalyst ratio must be accordingly increased to reduce the catalysts negative contribution to $F_n$. As a result, all telechelic PBDs in this study were synthesized with a monomer to catalyst ratio of 2000.

The high molecular weight nature of the PBD prevented an accurate determination of the $F_n$ of entries 2 and 3 (Table 3) by $^1$H NMR, but their theoretical $F_n$'s were calculated to be 1.95 and 1.90, respectively. As such, between 5 and 10% of the polymer chains may be diblocks. By way of comparison, entry 1 (Table 3) has a theoretical $F_n$ of 1.99 and thus less than 1% of the polymer chains are diblocks. Longer reaction times may be another explanation for the relatively large PDI of the SBS triblocks. Since the rate of reaction was reduced by the relatively larger amounts of solvent required to dissolve the higher molecular PBD, more time would be allocated for side reactions (such as elimination or termination) to occur.

Figure 2:
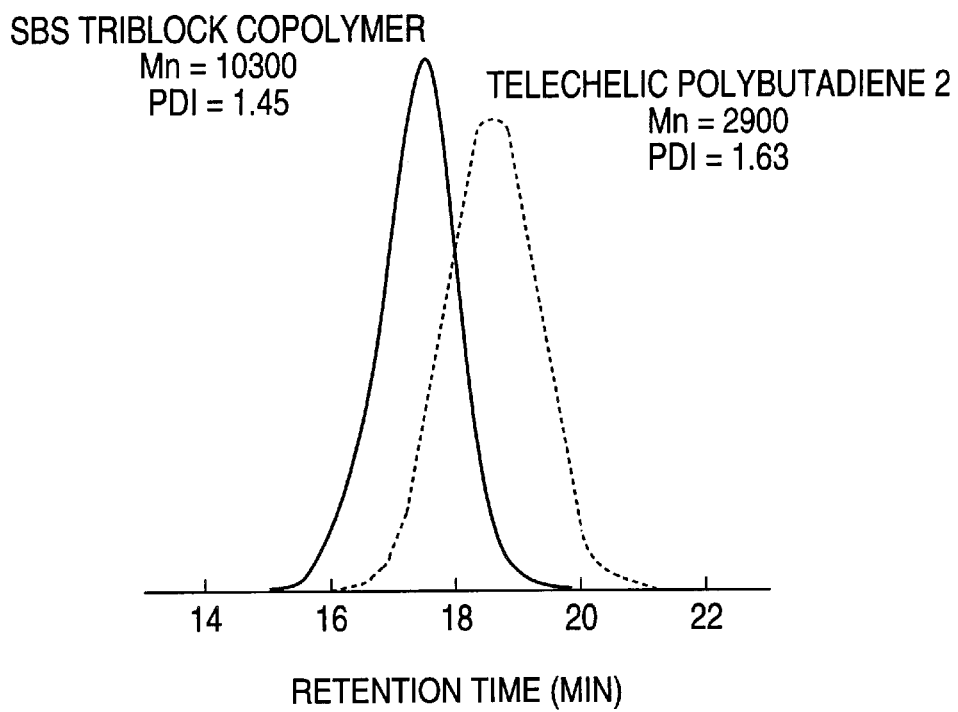
FIG. 2 is a typical GPC trace of telechelic PBD 2 and SBS triblock copolymer prepared via ATRP of styrene initiated with 2.

The $M_{n, gpc}$ values agree with the theoretical molecular weights ("$M_{n, theo}$") which were calculated based on monomer conversion and the assumption that each macroinitiator chain contained two allyl chloride end groups. GPC measurements also indicated that the molecular weight distributions were unimodal and no signal attributed to the starting macroinitiators; could be detected. Typical GPC chromatograms of the starting telechelic PBD 2 and SBS triblock copolymers are illustrated in FIG. 2. FIG. 2 shows a typical GPC trace of telechelic PBD 2 and SBS triblock copolymer prepared via ATRP of styrene initiated with PBD 2. In FIG. 2, the solid line shows the chromatogram for an SBS triblock copolymer having an $M_n$ of 10300 and an PDI of 1.45 and the dotted line show the chromatogram for telechelic polybutadiene 2 having an $M_n$ of 2900 and PDI of 1.63.

Figure 3:
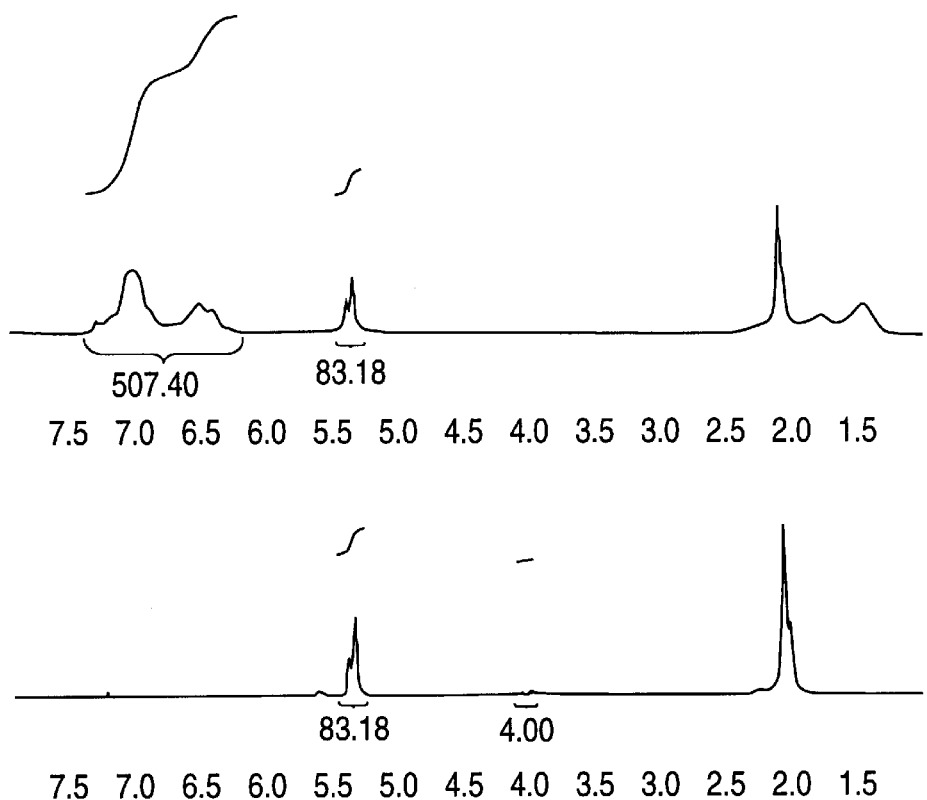
FIG. 3 is a $^1$H NMR spectra of telechelic PDB 2 and SBS triblock copolymers synthesized by a tandem ROMP-ATRP approach.

The SBS triblock copolymers were also examined using $^1$H NMR spectroscopy. Comparison of the $^1$H NMR spectra of the telechelic macroinitiator (bottom) and the SBS triblock copolymers synthesized by a tandem ROMP-ATRP approach (top) are illustrated in FIG. 3. Examination of the PBD backbone of the MBM triblocks revealed no change in the cis-olefin content relative to the telechelic PBD, and only 1,4-PBD linkages were found. Two signals at 4.03 and 4.09 ppm, attributable to cis and trans allyl chloride end-groups of the PBD 2, respectively, were used to determine molecular weight via end-group analysis. These signals vanish upon the ATRP of styrene. New signals from the terminal benzyl chloride groups form at 4.55 ppm, but are too small to accurately determine the molecular weight of the SBS. Assuming that all of the allyl chloride end groups initiate, as seen in FIG. 3, integration of the proton resonances from the aryl groups of PS relative to the olefinic signals provides information on the amount of styrene incorporated into the triblock copolymer. Excellent agreement between M, theo and the $M_{n, nmr}$ is obtained by this method.

Since GPC or $^1$H NMR does not allow the discrimination between diblock and triblock copolymers of identical molecular weight, a method based on the cleavage of the central PBD block was used to determine block arrangement. Thus, PBD degradation of a SBS triblock copolymer (entry 3, Table 2, MW=12300) should return PS with a molecular weight of 4950. However, a SB diblock structure must be assumed if the molecular weight of the isolated PS is two-fold higher than expected. Degradation of the PBD core of SBS with OsO$_4$/H$_2$O$_2$ gave PS with $M_{n, gpc}$=4900 (PDI=1.23). No PBD was observed in the $^1$H NMR spectra indicating that the degradation was complete. Thus, this result provides direct evidence that the arrangement of SBS polymers synthesized using the tandem ROMP/ATRP approach were indeed triblock in nature.

Mixed Halide Catalyst Systems

Matyjaszewski and coworkers have recently reported that mixed halide systems (where the initiator and organometallic complex contain different halides) can provide better agreement between $M_{n, theo}$ and experimental molecular weights and lower PDIs. The basis for the increased control is thermodynamic. ATRP is an equilibrium process and governed by relative copper$^{II}$ halide and carbon halide bond energies. Since a copper$^{II}$ bromide bond is weaker than a copper$^{II}$ chloride bond, lower PDIs should be observed when employing CuBr as the catalyst due to faster deactivation rates.

To determine whether a mixed halide system provides lower PDIs in the above experiments, several SBS triblock copolymers were synthesized using both CuCl and CuBr. Table 4 shows a comparison in polymerization results between mixed halide and single halide systems.

TABLE 4

| Entry | Metal System | [Sty]$_o$/[Init]$_o$ | $M_{n, theo}$ | $M_{n, sec}$ | PDI | % Conv |
|---|---|---|---|---|---|---|
| 1 | CuCl | 80 | 10459 | 10300 | 1.45 | 96 |
| 2 | CuBr | 80 | 10188 | 10100 | 1.45 | 93 |
| 3 | CuCl | 20 | 4283 | 4900 | 1.51 | 90 |
| 4 | CuBr | 20 | 4162 | 4800 | 1.48 | 88 |

The general conditions for the reaction include: for the initiator/CuBr/bipy is 1/2/6 at 130° C. for 7 hours in Ph$_2$O solvent and N$_2$ atmosphere. The telechelic PBD MW is 2400 and PDI is 1.59. The concentration of the initiator is 50 mM. The $M_{n,\ theo}$ was calculated based on monomer conversation and assumes $F_n=2.0$. The $M_{n,\ sec}$ was determined relative to PS standards in THF. The % Conv was determined by GC. The reactions employing CuBr polymerize at a slighter slower rate (vide infra) which is a manifestation of an increased deactivation rate. However, no significant difference in polydispersity between the two metal systems was found. Thus, these results suggest that mixed halide systems have no substantial advantage over analogous single halide systems in these reactions. In other words, ATRP of styrene using an analogous bromide based macroinitiator with CuCl as the catalyst may provide an alternative route to controlling the polymerization through halide exchange.

Kinetics of the ATRP of Styrene

For comparison, the rates of the CuBr and CuCl catalyzed ATRP of styrene using telechelic PBD macroinitiator 2 were monitored using gas chromatography and GPC. To avoid any fractionation of the polymer samples during isolation, which would artificially narrow the PDIs, aliquots from the polymerization were diluted with THF eluted through a short column of alumina to remove any metal salts and then injected directly into the GPC.

Figure 4:
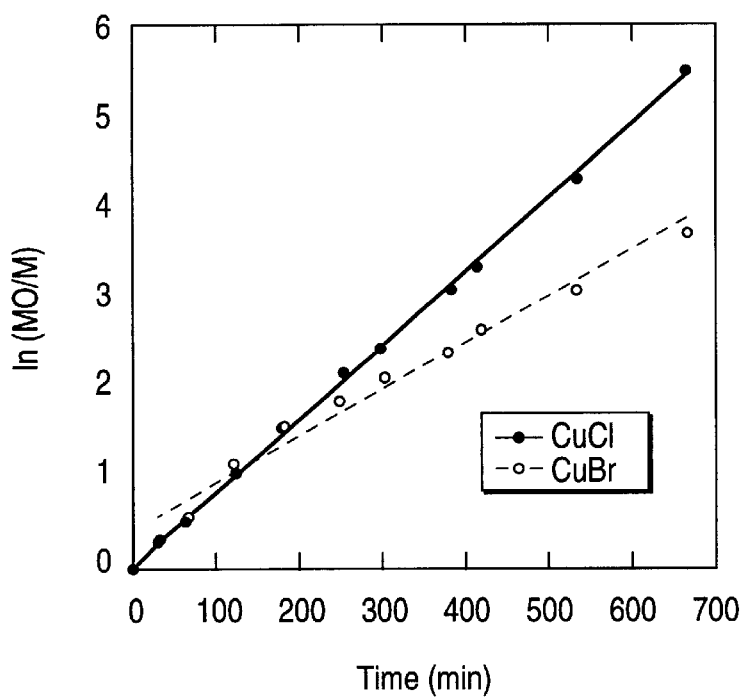
FIG. 4 illustrates the kinetic behavior of ATRP of styrene at 130° C.

FIG. 4 presents kinetic data for the polymerization of styrene from a telechelic PBD macroinitiator (MW=2400) in the presence of the CuCl bipy catalyst system. In particular, FIG. 4 shows the kinetics of ATRP of styrene at 130° C., initiated with 2, using CuBr and CuCl catalysts. The concentration of the initiator was 50 mM, $[CuX]_o$ was 100 mM, $[bipy]_o$ was 300 mM, $[styrene]_o$ was 4 M. The reaction occurred in the presence of $Ph_2O$ as a solvent. The straight semilogarithmic plot of In $([M]_o/[M])$ vs. time gives a pseudo-first order rate constant of $7.3 \times 10^{-3}\ M^{-1} min^{-1}$ and indicates that the concentration of growing radicals is constant. The semilogarithmic plot of In $([M]_o/[M])$ vs. time for CuBr has a slight curvature at low conversion which may result from some halide exchange effects. Nevertheless, a pseudo-first order rate constant of $4.4 \times 10^{-3}\ M^{-1}\ min^{-1}$ was derived which agrees with Matyjaszewski's result of $4.5 \times 10^{-3}\ M^{-1}\ min^{-1}$ for the ATRP of styrene using allyl chloride as the initiator. The slower polymerization rate for the CuBr system relative to the CuCl system supports the faster deactivation rate concluded above.

Figure 5B:
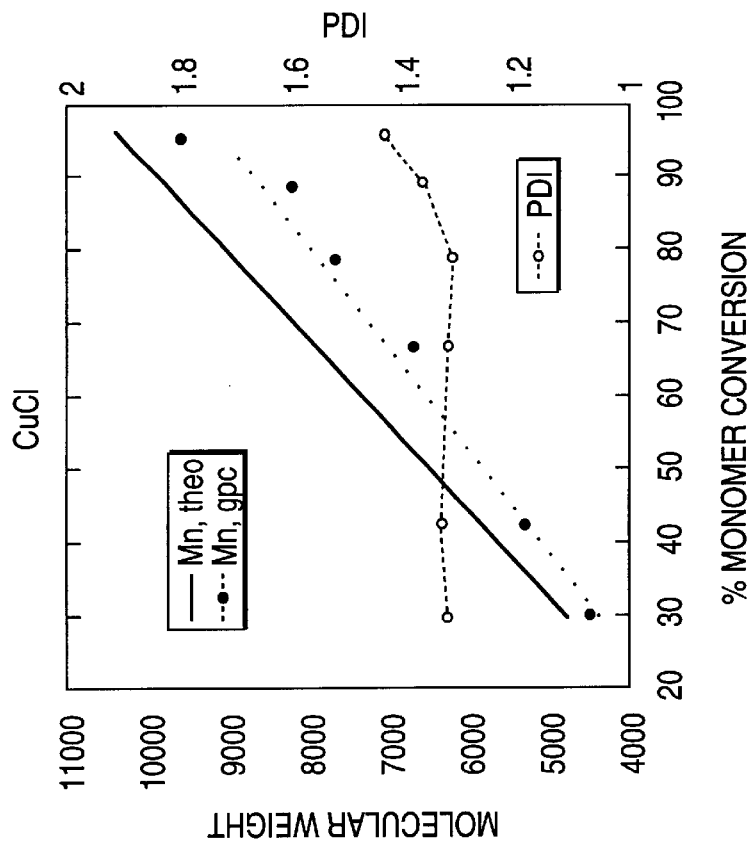
FIG. 5 illustrates the molecular weight and PDI dependence on monomer conversion for ATRP of styrene initiated with 2 using CuBr and CuCl catalysts.
Figure 5A:
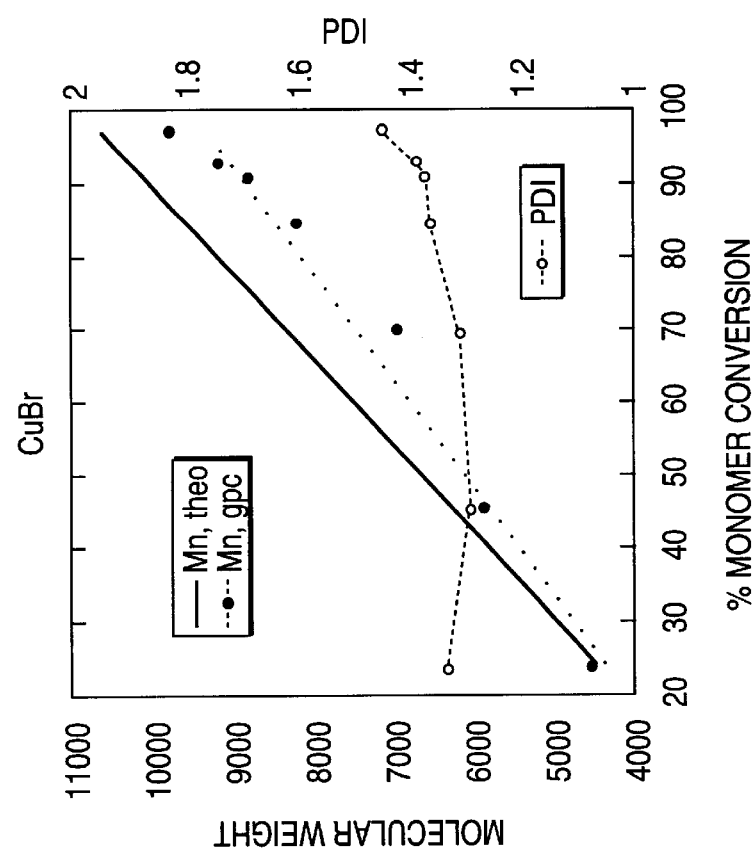

In addition, $M_{n,\ gpc}$ linearly increases with monomer conversion for both the CuCl and CuBr metal systems and closely matches $M_{n,theo}$. As shown in FIG. 5, the molecular weight and PDI dependence on monomer conversion for ATRP of styrene initiated with 2 using CuBr and CuCl catalysts. The concentration of the initiator was 50 mM, $[CuX]_o$ was 100 mM, $[bipy]_o$ was 300 mM, $[styrene]_o$ was 4 M. The reaction occurred in the presence of $Ph_2O$ as a solvent. The slight discrepancies between the experimental and theoretical data may be related to differences in hydrodynamic volume between the SBS triblocks and the PS standards used to calibrate the GPC. This result provides additional evidence that telechelic PBD 2 is an efficient initiator and the number of active chains remains constant during the polymerization.

Controlling Polydispersity: Effects of Catalyst Solubility and Temperature

Matyjaszewski and coworkers have shown that the polydispersity of the polymers obtained using ATRP is strongly affected by the solubility of the mediating metal. Using ligands with a long or branched alkyl side-chains were found to completely dissolve the metal complex resulting in polymers with a remarkably low PDI (1.05). To determine whether a soluble copper catalyst would reduce the PDI of resultant SBS triblock copolymers, a known bipyridine derivative, 4-4'-di-n-heptyl-2,2'-bipyridine ("dHbipy") 4, was employed.

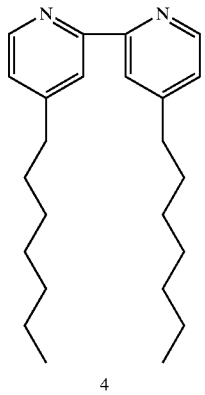

4

As expected, copper complexes containing ligand 4 were more soluble than complexes containing bipy. ATRP of styrene using ligand 4 under conditions identical to entry 3 (Table 2) produces a SBS triblock with a relatively lower PDI (1.25 vs. 1.45, Table 5). This low PDI is competitive with SBS produced anionically.

Table 5 shows the effects of ligand temperature on SBS polydisperity:

TABLE 5

| Entry/Ligand | Temp (° C.) | $[Sty]_o/[Init]_o$ | $M_{n,\ theo}$ | $M_{n,\ gpc}$ | PDI | % Conv. |
|---|---|---|---|---|---|---|
| 1/bipy | 130 | 80 | 10188 | 10100 | 1.45 | 93 |
| 2/dHbipy (4) | 130 | 80 | 9607 | 10000 | 1.25 | 92 |
| 3/bipy | 110 | 80 | 8356 | 6800 | 1.36 | 71 |
| 4/bipy | 130 | 80 | 8302 | 7000 | 1.31 | 70 |

The general conditions for the reaction include: for the initiator/CuBr/ligand is 1/2/6 for 7 hours in $Ph_2O$ solvent and $N_2$ atmosphere. The telechelic PBD MW is 2400 and PDI is 1.59. The concentration of the initiator is 50 mM. The $M_{n,\ theo}$ was calculated based on monomer conversation and assumes $F_n=2.0$. The $M_{n,\ gpc}$ was determined relative to PS standards in THF. The % Conv was determined by GC. Entry 1 was obtained from data from Table 2, entry 3.

Employing lower reaction temperatures can minimize termination or side reactions, such as halide elimination. The ATRP of styrene with macroinitiator 2 at 110° C. lowered the PDI from 1.45 to 1.36. However, the reaction was significantly slower, achieving only 71% conversion after seven hours. For comparison, an analogous polymerization at 130° C. reaches a similar conversion after only two hours and gives a polymer with a PDI=1.3 1. Thus, there appears to be no advantage in running these polymerizations at lower temperatures.

One Pot Synthesis of SBS Triblock Copolymers

The ability to extend the tandem ROMP-ATRP approach to SBS triblock copolymers into a one-pot process was demonstrated by the following experiment. A telechelic PBD was prepared as described above (entry 3, Table 2) in a Schlenk flask and assumed to produce polymer in 75% yield with a molecular weight of 2400 after 24 hours. After terminating the polymerization with ethyl vinyl ether, the polymer was placed under dynamic high vacuum to remove any residual monomer, CTA, terminating agent, and low molecular weight cyclic olefins. The flask was then placed under inert atmosphere and charged with appropriate amounts of CuBr, bipy, styrene, and diphenyl ether. After 7 hours at 130° C., SBS triblock copolymer with a MW and PDI similar to SBS produced via the two step method discussed above was obtained. Table 6 provides data for a one pot synthesis of SBS triblock copolymers. One pot or two pot refers to the total number of reaction vessels employed during the synthesis.

TABLE 6

| Entry | Conditions | $M_{n, theo}$ | $M_{n, sec}$ | PDI | % Conv |
|---|---|---|---|---|---|
| 1 | 2-Pot, CuBr | 10188 | 10100 | 1.45 | 93 |
| 2 | 1-Pot, CuBr | 9795 | 10500 | 1.40 | 92 |
| 3 | 1-Pot, Cu° | 12000 | 11400 | 1.66 | 60 |
| 4 | 1-Pot, Cu° | 8254 | 8000 | 1.63 | 73 |

The general conditions for the reaction include: for the initiator/Cu° or CuBr/bipy is 1/2/6 at 130° C. for 7 hours in $Ph_2O$ solvent and $N_2$ atmosphere. The telechelic PBD MW is 2400 and PDI is 1.59 (which is assumed for entries 2–4). The concentration of the initiator is approximately 50 mM. The $M_{n, theo}$ was calculated based on monomer conversation and assumes $F_n$=2.0. The $M_{n, sec}$ was determined relative to PS standards in THF. The % Conv was determined by GC. Entry 1 was obtained from data from Table 2, entry 3. Data for Entries 2 and 3 was obtained under conditions of high vacuum applied after PBD polymerization was terminated to remove impurities. No vacuum was applied at any point during the synthesis for entry 4. Radical polymerizations generally must be carried out in oxygen-free environments to prevent reaction of oxygen with organic free radicals and/or catalyst. However, Matyjaszewski has recently shown that ATRP can occur in a closed system under an atmosphere of air when Cu° (combined with small amounts of $Cu^{II}$) is used in lieu of $Cu^I$ halide salts. As shown by Scheme 8, copper(0) powder recycles $Cu^{II}$ to the active $Cu^I$ catalyst through a dynamic equilibrium that includes the effective removal of adventitious oxygen in the solution and in the headspace above the solution.

SCHEME 8

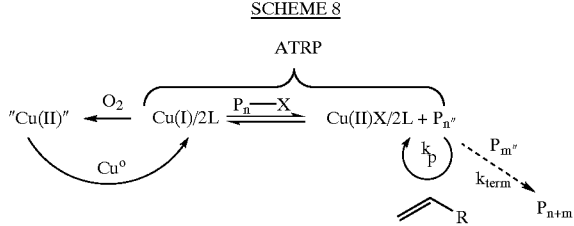

Remarkably, this process was also found to deactivate radical scavengers such as 4-tert-butylcatechol ("BHT") and hydroquinone monomethyl ether ("MEHQ"). This has allowed the synthesis of well-defined polymers via ATRP using unpurified monomers and solvents and circumvents the need for sophisticated techniques and equipment necessary to obtain inert atmospheres.

The synthesis of SBS triblock copolymers via a simplified one-pot procedure was performed as follows. A telechelic PBD with an assumed molecular weight of 2400 and yield of 75% was prepared as above. After terminating with ethyl vinyl ether, the flask was charged with appropriate amounts of phenyl ether, styrene, bipyr, copper powder, and $CuBr_2$. All reagents were used as received and no vacuum was applied after termination. The flask was capped and placed in an oil bath at 130° C. for 7 hours. As shown in Table 6, monomer conversion is lower than the analogous two-pot synthesis (Table 2, entry 3), presumably due to relatively more dilute conditions. While good agreement between the theoretical and the experimental MW was observed, the PDI is relatively large. This may reflect copper deactivation through coordination with ethyl vinyl ether. However, no significant difference from a control experiment where the residual ethyl vinyl ether was removed before adding the reagents necessary for the ATRP of styrene was observed (Table 6).

Attempted Synthesis of MBM Triblock Copolymers via ATRP of MMA Initiated with 2

Recently, significant attention has focused on the synthesis of well-defined MBM triblock copolymers. It has been concluded that only MBM with a low 1,4-PBD microstructure content and dismal elastomeric properties can be prepared anionically. Since the SBS triblocks prepared in this study were shown to have entirely 1,4-PBD microstructure, a new route to MBM triblock copolymers via a tandem ROMP-ATRP approach was further explored.

The preparation of MBM using allyl chloride terminated telechelic PBDs 2 as macroinitiators for the ATRP of MMA was attempted under a myriad of conditions, including variations on time, temperature, and catalyst concentration. Scheme 9 depicts the attempted synthetic route.

SCHEME 9

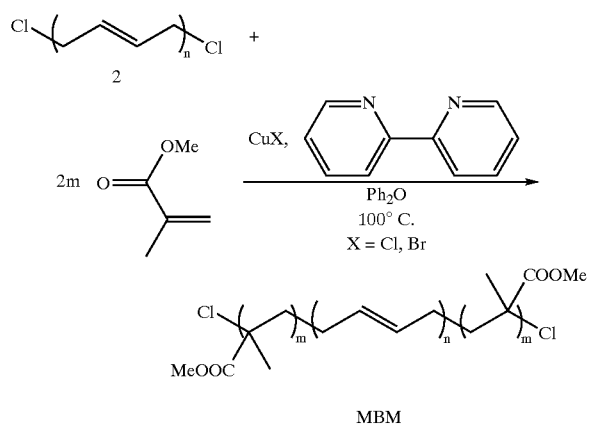

MBM

Figure 6:
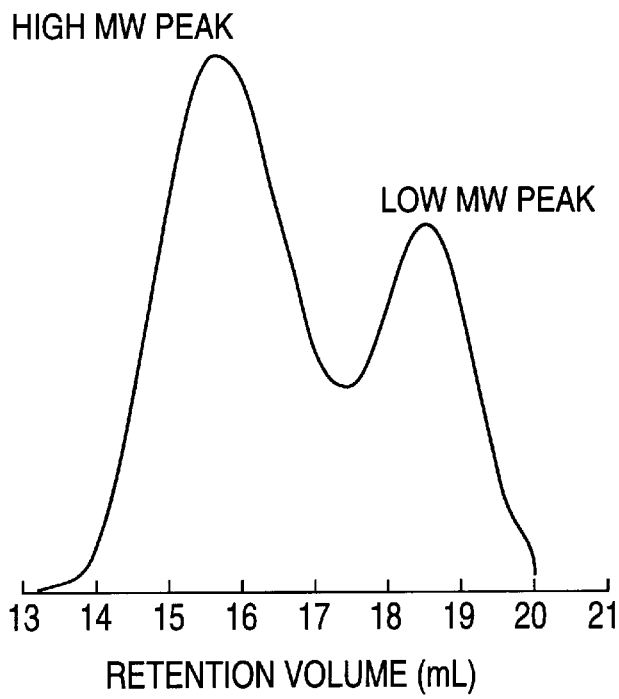
FIG. 6 illustrates the molecular weight distribution of MBM triblock copolymers obtained by ATRP of MMA using 2.

As illustrated by FIG. 6, bimodal distributions were consistently found in the GPC traces. FIG. 6 shows the retention volume of MBM triblock copolymers obtained by ATRP of MMA using 2. The low molecular weight peak is in the range of unreacted macroinitiator and suggests the high molecular weight peak corresponds to a mixture of triblock and diblock copolymers. The bimodality is presumably due an initiation rate relatively slow to propagation. This is supported by a decreasing low molecular weight peak area with monomer conversion and the observation of residual allyl chloride resonances in the $^1H$ NMR spectra of the isolated polymers.

Figure 7:
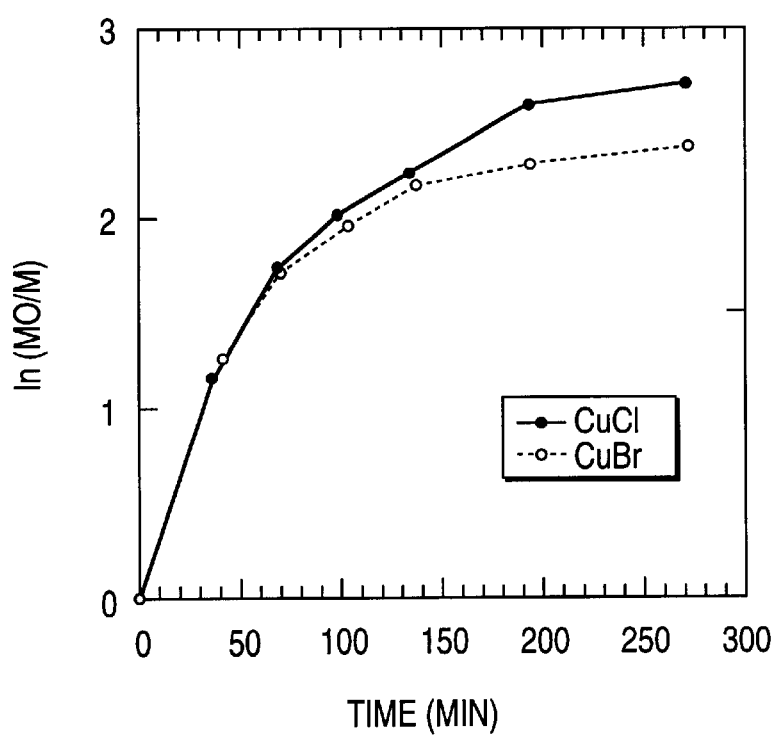
FIG. 7 illustrates the kinetics of the ATRP of MMA initiated with 2 using CuCl and CuBr catalysts.

Further evidence of slow initiation was provided through a kinetics study of the ATRP of MMA using macroinitiator 2. FIG. 7 shows the kinetics data of the ATRP of MMA initiated with 2 using CuCl and CuBr catalysts. As illustrated, FIG. 7 presents the polymerization kinetic data using a telechelic PBD (MW=2700) in the presence of CuCl/bipy (1/3) at 130° C. The semilogarithmic plot of In ([M]$_0$/[M]) vs. time indicates that the concentration of radicals is nonlinear and prevented derivation of a pseudo-first order rate constant. The experimental molecular weights increased with monomer conversion, but the molecular weights were higher than theoretical predictions based on quantitative initiation.

Analogous results using CuBr/bipy as the catalyst were also observed. Recently, two nickel-based ATRP catalysts, NiBr$_2$(PPh$_3$)$_2$ and NiBr$_2$(PnBu$_3$)$_2$, were reported to polymerize MMA at a much slower rate compared to copper based systems. However, nickel catalyzed ATRP of MMA using 2 showed no improvement and bimodal distributions were still observed.

Synthesis and Study of 2-Bromo Propionate Capped Telechelic Poly(butadiene)

Both 2-bromo isobutyrates and 2-bromo propionates have been shown to be efficient ATRP initiators of MMA. Thus, their potential as CTAs in the ROMP of COD was investigated. As illustrated by Scheme 10, simple esterification of commercially available cis-2-butene1,4-diol with an excess of the appropriate acid bromide gave bis(2-bromo isobutyrate) 6 and bis(2-bromo propionate) 8.

SCHEME 10

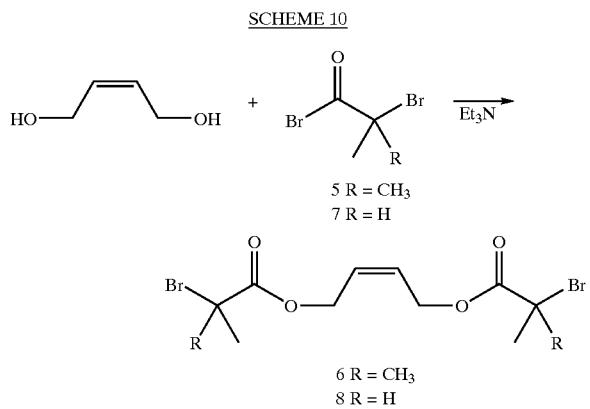

Due to purification difficulties with 6, only 8 was used for further study. The ROMP of COD in the presence of the CTA 8 resulted in bis(2-bromo propionate) functionalized telechelic PBD 9 as shown in Scheme 11.

SCHEME 11

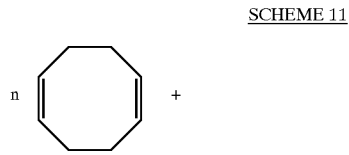

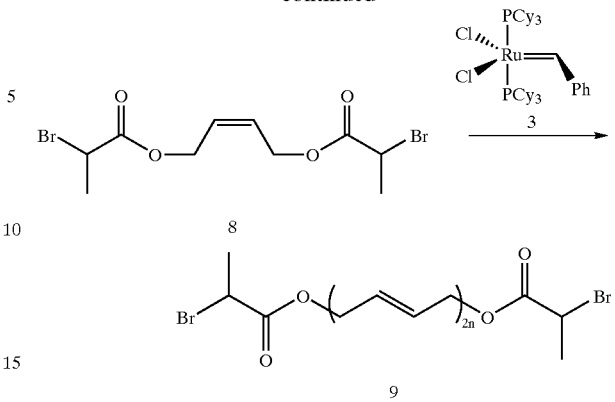

The polymerizations were run in a similar manner as 2 and the results for a variety of conditions investigated are summarized in Table 7. Table 7 lists the results of the optimization studies for the ROMP of COD in the presence of bis(2-bromopropionyl) CTA 8.

TABLE 7

| COD/CTA (mol) | Temp (° C.) | Time (h) | Yield (%) | X$_n$ | M$_n$ (GPC) | PDI | % cis |
|---|---|---|---|---|---|---|---|
| 5/1 | 25 | 24 | 64 | 23 | 4900 | 1.49 | 64 |
| 5/1 | 25 | 48 | 58 | 24 | 4700 | 1.52 | 61 |
| 5/1 | 40 | 24 | 59 | 28 | 5000 | 1.50 | 65 |
| 10/1 | 25 | 24 | 75 | 30 | 5300 | 1.62 | 66 |
| 50/1 | 25 | 24 | 87 | 120 | 16700 | 2.08 | 63 |
| 100/1 | 25 | 24 | 85 | 128 | 24400 | 2.31 | 60 |

As shown in Table 7, the X$_n$ was determined by $^1$H NMR assuming that F$_n$=2.0. The M$_n$ (GPC) was determined relative to PMMA standards in THF. % cis refers to percent cis-olefin found in the PBD, as determined by $^1$H NMR. Analogous to the PBD 2, long reaction times and elevated temperatures had little or no effect on the polymerization results. The molecular weights determined by $^1$H NMR using end group analysis were significantly lower than those obtained by GPC presumably due to the large differences in hydrodynamic volume between PBD and the PMMA standards used for calibration. The PDI of the isolated polymers were between 1.5 and 2.3. $^1$H and $^{13}$C NMR indicated the presence of only 1,4-PBD linkages in the polymer backbone and supported a F$_n$ near 2.0. In addition, the PBD exhibited ca. 66% cis-olefin geometry.

Synthesis of MBM Triblock Copolymers via ATRP of Telechelic Macroinitiators

As illustrated by Scheme 12, telechelic PBD 9 was used as a macroinitiator for the heterogeneous ATRP of MMA to produce MBM triblock copolymers.

SCHEME 12

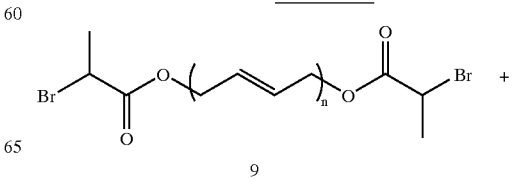

-continued

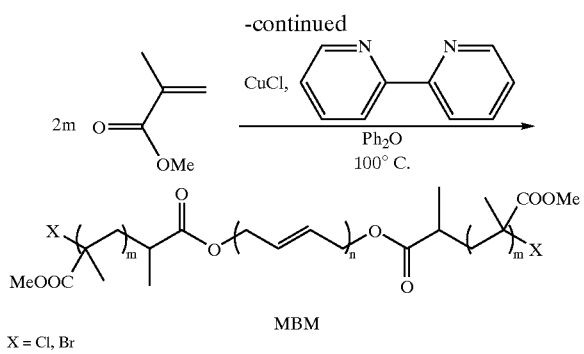

MBM

X = Cl, Br

The polymerizations were run under similar conditions as for the synthesis of SBS. After 2.5 hours at 100° C., the polymerizations were terminated by pouring the reactions into an excess of methanol causing the immediate precipitation of a white solid. Table 8 summarizes the polymerization results for a variety of monomer/initiator ratios. In particular, Table 8 provides data obtained during the synthesis of MBM triblock copolymers via ATRP of MMA initiated with telechelic poly(butadiene).

TABLE 8

| Entry | $[Sty]_o/[Init]_o$ | $M_{n,theo}$ | $M_{n,gpc}$ | $M_{n,nmr}$ | PDI | % Conv | Yield |
|---|---|---|---|---|---|---|---|
| 1 | 20 | 4431 | 9400 | 4700 | 1.58 | 86 | 77 |
| 2 | 80 | 10548 | 18100 | 11500 | 1.54 | 99 | 90 |
| 3 | 180 | 20561 | 28300 | 23900 | 1.59 | 99 | 88 |
| 4 | 360 | 38743 | 49600 | 41700 | 1.68 | 99 | 99 |

Figure 8:
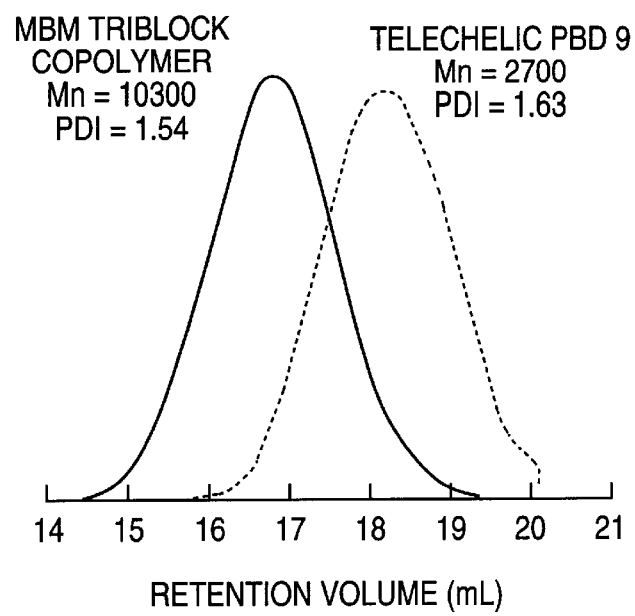
FIG. 8 shows typical GPC traces of PBD 9 and MBM synthesized by ATRP of MMA initiated with 9.
Figure 9:
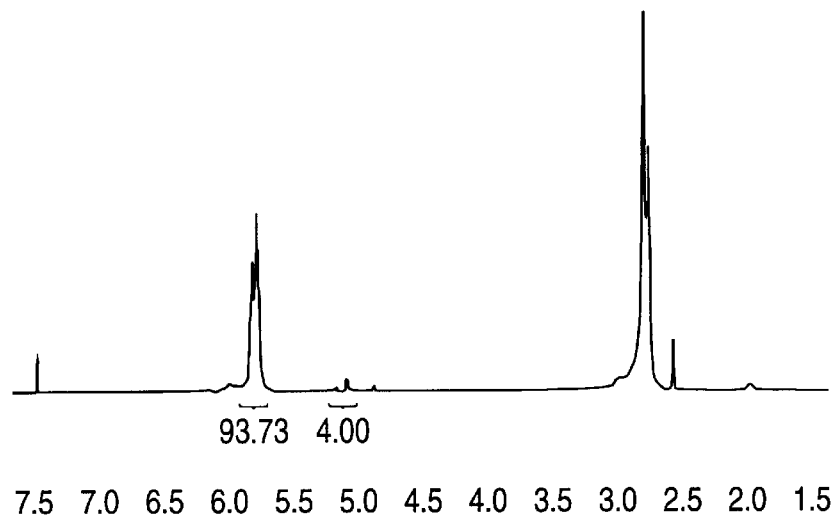
FIG. 9 is a $^1$H NMR spectra of telechelic PDB 9 and MBM triblock copolymers synthesized by a tandem ROMP-ATRP approach.
Figure 9:
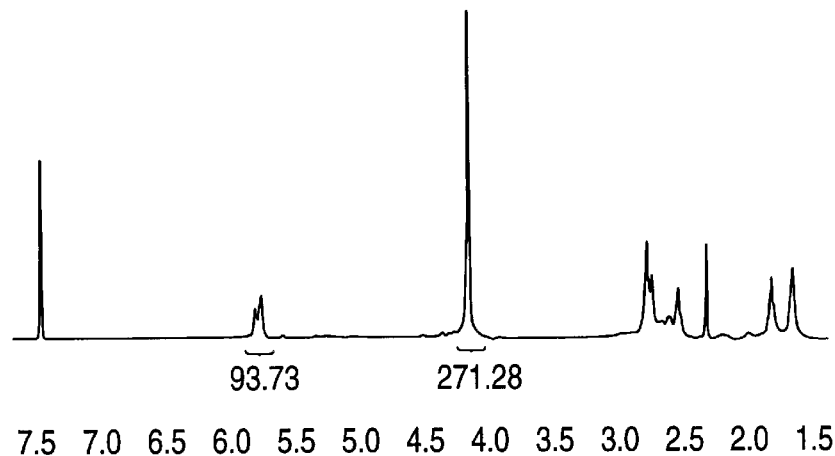

The general conditions for the reaction include: for the initiator/CuCl/bipy is 1/2/6 at 100° C. for 2.5 hours in Ph$_2$O solvent and N$_2$ atmosphere. The telechelic PBD MW is 2700 and PDI is 1.49. The concentration of the initiator is 25 mM. The $M_{n,\ theo}$ was calculated based on monomer conversation and assumes $F_n$=2.0. The $M_{n,\ gpc}$ was determined relative to PMMA standards in THF. The $M_{n,\ nmr}$ was determined by $^1$H NMR using a "relative" end-group analysis procedure. The % Conv was determined by GC and the yield was the isolated yield. For entry 4, the reaction was performed in bulk MMA. GPC traces showed that the triblock copolymer MW distributions are unimodal and low (ca. 1.6). In addition, agreement between $M_{n,\ gpc}$ and the theoretical $M_{n,\ theo}$, improved with length of the PMMA segments. Typical GPC chromatograms of the starting telechelic PBD and MBM triblock copolymer are illustrated in FIG. 8. In particular, FIG. 8 shows the typical SEC traces of PBD 9 and MBM synthesized by ATRP of MMA initiated with 9. The solid line represents an MBM triblock copolymer having an $M_n$ of 10300 and a PDI of 1.54. The dofted line depicts a telechelic PBD 9 having an $M_n$ of 2700 and a PDI of 1.63. The $^1$H NMR spectrum of the PBD 9 shows two signals at 4.60 and 4.71 ppm attributable to cis and trans allylic ester end-groups, respectively, and were used to determine molecular weights via end-group analysis, assuming $F_n$=2.0. FIG. 9 illustrates a comparison between the $^1$H NMR spectra of telechelic PBD 9 (top) and MBM triblock copolymer synthesized via tandem ROMP-ATRP (bottom). While the $^1$H NMR spectrum of the MBM triblocks reveals that the allylic ester signals have completely vanished, the new bromo-methacrylate end-group resonances (4.23 ppm) were barely observable. However, molecular weight data could still be obtained using the "relative" end group approach discussed above. No change in the PBD microstructure in the MBM triblock copolymers was found.

A variety of other catalyst systems were explored in the synthesis of MBM (Table 9). The CuBr/bipy system, which was effective in the synthesis of SBS, was found to give MBM with bimodal distributions in the GPC spectrum. This may a consequence of halide exchange effects as alkyl bromide initiators combined with CuBr metal systems give fast initiation and fast propagation rates due to the relatively weak carbon bromide bond. The success of using R—Br/CuCl is attributable to the relatively strong carbon-chloride bond. Due to the equilibrium nature of ATRP, shortly after initiation, nearly all of the active polymer chains are deactivated with chloride atoms. The stronger carbon-chloride bond drastically slows propagation allowing a controlled polymerization to occur. In addition, the results of employing two nickel based ATRP catalyst systems, NiBr$_2$(PPh$_3$)$_2$ and NiBr2(PnBu$_3$)$_2$, are summarized in Table 9. All catalyst systems except CuCl/bipy resulted in either bimodal or polydisperse distributions. Table 9 shows the results of the synthesis of MBM triblock copolymers using a variety of catalysts.

TABLE 9

| Entry | Catalyst | $M_{n,\ theo}$ | $M_{n,\ gpc}$ | PDI | % Conv. |
|---|---|---|---|---|---|
| 1 | CuCl/Bipy | 10548 | 18300 | 1.54 | 99 |
| 2 | CuBr/Bipy | 10356 | 37500 | | 96 |
| 3 | NiBr$_2$(Pη-Bu$_3$)$_2$ | 11300 | 23200 | 3.34 | 99 |
| 4 | NiBr$_2$(PPh$_3$)$_2$ | 9873 | 23300 | 3.27 | 90 |

The general conditions common to all polymerizations include the telechelic PBD MW is 2700, the PDI is 1.6 and the $[MMA]_o/[Init]_o$ is 80. For the copper based systems, the initiator/CuCl/bipy is 1/2/6 at 100° C. for 2.5 hours in Ph$_2$O solvent and N$_2$ atmosphere. The concentration of the initiator is 25 mM. For nickel based systems, the initiator/Al (OiPr)$_3$ is 1/4 at 100° C. for 18 hours in toluene solvent and N$_2$ atmosphere. The concentration of the initiator is 20 mM. The $M_{n,\ theo}$ was calculated based on monomer conversation and assumes $F_n$=2.0. The $M_{n,\ gpc}$ was determined relative to PMMA standards in THF. The % Conv was determined by GC. For entry 2, the $M_{n,\ gpc}$ entry of 37500 reflects the $M_p$ of high MW peak. There is no PDI entry for entry 2 due to bimodal distribution. In addition, for entry 3, the Ni/Initiator is 8 and for entry 4, the Ni/initiator is 1.

Kinetics of the ATRP of Methyl Methacrylate

Figure 11:
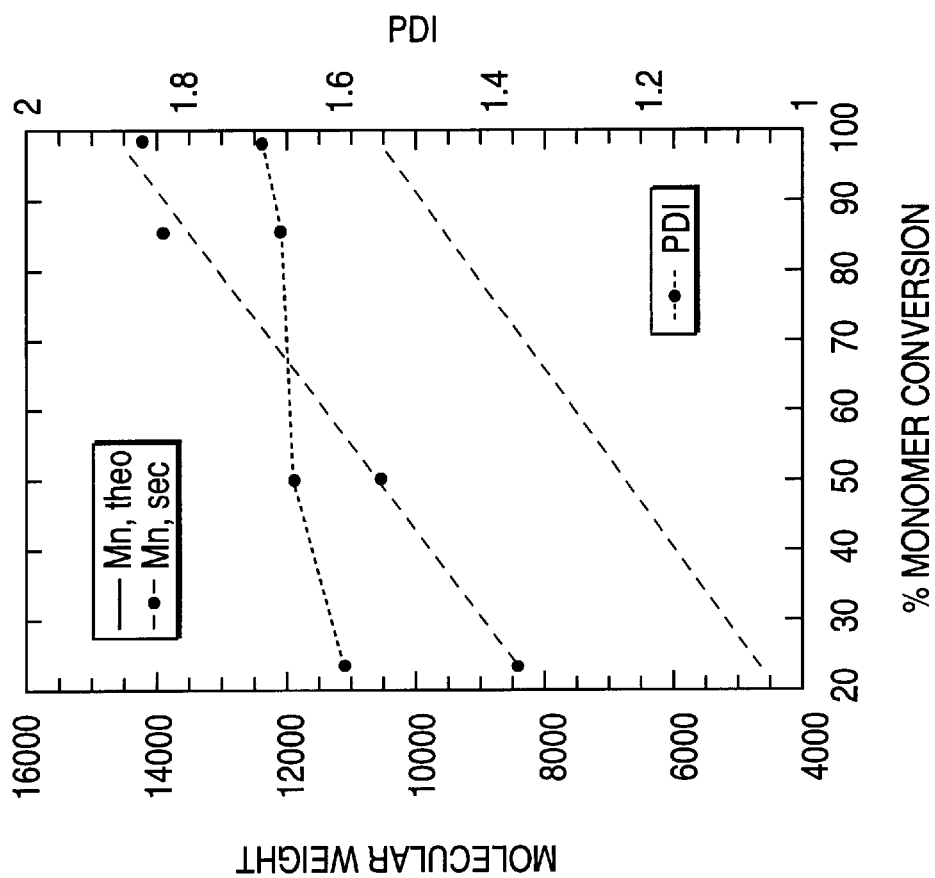
FIG. 11 illustrates the molecular weight and PDI dependence on monomer conversion for ATRP of MMA initiated by 9 using CuCl catalyst.
Figure 10:
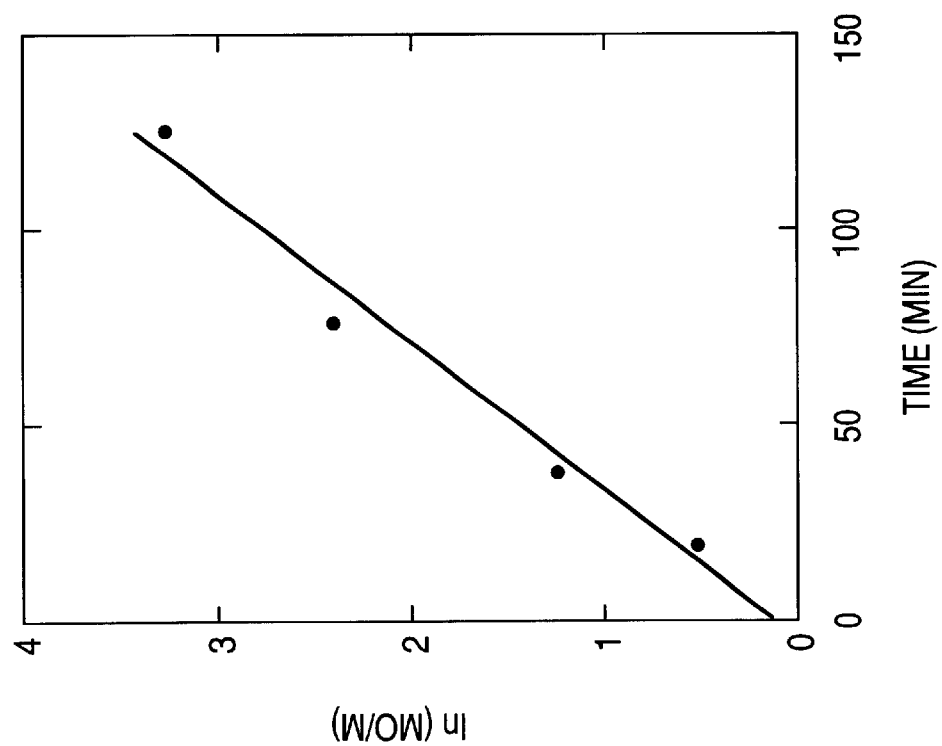
FIG. 10 illustrates the kinetics of the ATRP of MMA initiated by 9 catalyzed by CuCl at 100° C. in Ph$_2$O.

The kinetics of the ATRP of MMA using telechelic PBD macroinitiators were studied with the CuCl/bipy catalyst system. FIG. 10 shows the kinetics data of the ATRP of MMA initiated by 9 catalyzed by CuCl, at 100° C. in Ph$_2$O. The concentration of the initiator was 50 mM, $[CuCl]_o$ was 100 mM, $[bipy]_o$ was 300 mM, $[MMA]_o$ was 4 M. The linear semilogarithmic plot of In ($[M]_o/[M]$) vs. time indicates a constant concentration of growing radicals and a pseudo-first order rate constant of $3.5 \times 10^{-2}$ M$^{-1}$min$^{-1}$ was derived. FIG. 11 shows the molecular weight and PDI dependence on monomer conversion for ATRP of MMA initiated by 9 using CuCl catalyst in Ph$_2$O. The concentration of the initiator was 50 mM, $[CuX]_o$ was 100 mM, $[bipy]_o$ was 300 mM, $[MMA]_o$ was 4 M. The experimental molecular weight determined by GPC linearly increases with monomer conversion for the CuCl metal system, but is larger than the $M_{n,\ theo}$ (FIG. 11). Polydispersity remained low (<1.6) throughout the polymerization. These results provide solid evidence that the telechelic PBD macroinitiator 9 is efficient and the number of active chains remains constant during the polymerization.

In summary, two CTAs functionalized with allyl chloride and 2-bromopropionyl ester groups were synthesized and successfully employed in the ROMP of COD to prepare telechelic PBDs. The impact of reaction time, temperature, and the monomer to CTA ratio on the polymerizations were investigated. Resultant polymers were found to contain only 1,4-PBD microstructure with predominately cis-olefin geometry.

The bis(allyl chloride) telechelic PBD was successfully employed as a macroinitiator for the ATRP of styrene using CuCl/bipy and CuBr/bipy catalyst systems. Well-defined SBS triblock copolymers with varying PBD and PS block lengths, predetermined molecular weights, and low polydispersity were obtained. Degradation of the PBD core and examination of the residual PS chains confirmed a triblock structure. Polydispersity could be effectively reduced under homogenous ATRP conditions through utilization of a more soluble bipyridine derivative. Examination of the kinetics of the ATRP of styrene using the bis(allyl chloride) macroinitiator revealed pseudo first order behavior.

The bis(2-bromopropionyl ester) telechelic PBD was found to be an efficient initiator for the ATRP of MMA. Of a variety of metal catalysts employed, only CuCl/bipy was found to give well-defined MBM triblock copolymer with predictable molecular weights and low polydispersity. Polymerization kinetics were investigated and found to exhibit first order behavior.

A variety of well-defined SBS and MBM triblock copolymers have been synthesized via a tandem ROMP-ATRP approach. Both polymers contain very low levels of diblock contamination and the PBD backbone exhibits a perfect 1,4-microstructure. Since anionic methods of producing SBS and MBM triblocks introduce some degree of 1,2-PBD microstructure, the polymers prepared in this study may exhibit novel elastomeric properties. In addition, this approach is a milder and much easier method of synthesizing SBS and MBM triblocks than the anionic methods currently employed.

EXPERIMENTAL SECTION
General Considerations

All air sensitive manipulations were performed in a nitrogen-filled dry box or by using standard Schlenk techniques under an atmosphere of argon. Argon was purified by passage through columns of BASF R3-11 catalyst (Chemalog) and 4 Å molecular sieves (Linde). NMR spectra were recorded using a GE QE-300 Plus (300.1 MHz $^1$H; 75.49 MHz $^{13}$C) instrument in the indicated solvent. Chemical shift were recorded in parts per million ($\delta$) and splitting patterns are designated as s, singlet; d, doublet; t, triplet; q, quartet; m, multiplet; br, broad. Coupling constants, J, are reported in Hertz (Hz). Chloroform-d (7.26 ppm for $^1$H, 77.0 ppm for $^{13}$C) was used as an internal standard. Gas chromatography ("GC") was performed on a HP-5890 Series II gas chromatographer equipped with a 15 m×0.53 mm×0.5 µm J & W Scientific, Inc. DB-I dimethylpolysiloxane column and fifted with a flame ionization detector using helium as a carrier gas with a flow rate of 30 mL/min. Gel permeation chromatographs were obtained on a HPLC system using an Altex model 426 pump, a Rheodyne model 7125 injector with a 100 µL injection loop, two American Polymer Standards 10 micron mixed bed columns, and a Viscotek model 200 differential refractometer/viscometer using a 1.0 mL/min flow rate. Molecular weight and polydispersities were reported versus monodispersed poly (styrene) ("PS") or poly(methyl methacrylate) ("PMMA") standards. Flash chromatography was carried out with Silica Gel 60 (230–400 mesh) from EM Science or basic alumina gel from Fluka Chemical Company. Analytical thin layer chromatography ("TLC") was performed on KIESELGEL F-254 precoated silica gel or neutral alumina plates. Visualization was accomplished with UV light and an anisaldehyde stain.

Materials

Tetrahydrofuran ("THF"), toluene, and dichloromethane were dried and degassed by passage through solvent purification columns containing activated alumina. Diphenyl ether was degassed by three successive freeze-pump-thaw cycles. All other solvents were reagent grade and used without further purification. Cyclooctadiene (99+%, packed under nitrogen) was purchased from Aldrich Chemical Company was used as received. Styrene and methyl methacrylate were purified by passage through inhibitor removal columns (Aldrich), and then degassed and then stored at −40° C. 1,4-dichloro-2-butene (1) was purified by passage through an alumina column and then degassed. All other reagents were purchased from Aldrich Chemical Company and used without further purification.

cis-2-butene-1,4-diol bis(2-bromo)isobutyrate (6)

cis-2-Butene-1,4-diol (1.50 mL, 18.2 mmol, 1.0 equiv) was suspended in $CH_2Cl_2$ (100 mL) in a 300 mL round bottom flask under argon. The flask was then charged with 2-bromoisobutyryl bromide (4.50 mL, 36.4 mmol, 2.0 equiv) via syringe over 10 minutes during which time the reaction mixture turned yellow and slightly cloudy. Addition of triethylamine (5.05 g, 36.2 mmol, 2.0 equiv) via syringe caused the immediate formation of white precipitate which dissolved after one hour at ambient temperature. The resulting yellowish solution was poured into a 1 L separatory funnel and then washed with deionized water (4×50 mL) and brine (1×100 mL). The organic layer was collected and dried over $MgSO_4$.

After filtering away Mg solids, the solution was concentrated in vacuo to give a yellow oil (5.59 g, 80% yield). The compound was found to be unstable on silica gel or alumina preventing purification by flash column chromatography. $^1$H NMR (CDCl$_3$) $\delta$5.81 (t, J=4.5 Hz, 2H), 4.79 (d, J=4.8 Hz, 4H), 1.91 (s, 12H).

cis-2-butene-1,4-diol bis(2-bromo)propionate (8)

A 500 mL round bottom flask under argon was charged with $CH_2Cl_2$ (150 mL), cis-2-butene-1,4-diol (2.0 mL, 24.3 mmol, 1.0 equiv), and triethylamine (10.5 mL, 75.3 mmol, 3.1 equiv). The dropwise addition of 2-bromopropionyl bromide (8.0 mL, 76.4 mmol, 3.1 equiv) at ambient temperature caused the reaction mixture to turn orange in color followed a slight increase in temperature. The reaction was left to stir at ambient temperature under argon for 15 hours. The reaction was then poured into a 1 L separatory funnel and washed with deionized water saturated with sodium bicarbonate (3×100 mL), deionized water (3×100 mL) and 100 mL of brine. The organic layer was collected and dried over $MgSO_4$. After filtering away Mg solids, the solution was concentrated in vacuo to give a yellow oil. The product was purified by flash column chromatography (silica gel, 9:1 hexanes/ethyl acetate (v/v), R$_f$=0.10) to give 5.38 g (62%) or pure product as a viscous oil. $^1$H NMR (CDCl$_3$) $\delta$5.81 (t, J=4.5 Hz, 2H), 4.79 (d, J=4.8 Hz, 4H), 1.91 (s, 12H).

General Procedure for Preparing Telechelic poly (butadienes)

All manipulations were carried out in a nitrogen filled dry box. A 10 mL vial was charged with appropriate amounts of either 1,4-dichloro-2-butene (1) or cis-2-butene-1,4-diol bis (2-bromo)propionate (8), COD, and a stir bar. In a separate vial, the correct amount of initiator (3) was weighed out and then combined with the COD/CTA mixture forming a purple solution. The vial was then capped, removed from the dry box, and let stir for the desired time upon which an excess of ethyl vinyl ether was pipetted into the vial. The reaction was then stirred at room temperature for 1 h followed by precipitation into MeOH. The MeOH was then decanted away and the polymer was washed with fresh MeOH to remove any remaining COD or CTA. The resulting polymer was concentrated in vacuo and then characterized by $^1$H NMR, $^{13}$C NMR, and GPC.

Bis(allyl chloride)-functionalized telechelic poly(butadiene) (2)

Spectral data for the polymer obtained from a 5:1 COD/1 ratio: $^1$H NMR (CDCl$_3$) δ 5.39–5.43 (br, 83H), 4.09 (d, J=6.9 Hz, 1.5H), 4.03 (d, 6.8 Hz, 2.5H), 2.08–2.04 (br, 166H); $M_n$=2400, $X_n$=21. GPC (relative to poly(styrene) standards): $M_n$=2700, $M_w$=4200, PDI=1.59.

Bis(2-bromopropionate)-functionalized Telechelic poly (butadiene) (9)

Spectral data for the polymer obtained from a 5:1 COD/8 ratio: $^1$H NMR (CDCl$_3$) δ5.37–5.41 (br, 94H), 4.71 (d, J=6.8 Hz, 1.5H), 4.60 (d, J=6.7 Hz, 2.5H), 4.37 (q, 6.9 Hz, 2H), 2.03–2.05 (br, 188H), 1.82 (d, J=6.7 Hz, 6H); $M_n$=2700, $X_n$=23. GPC (relative to poly(methyl methacrylate) standards): $M_n$=5500, $M_w$=8600, PDI=1.57.

General Procedure for ATRP of Styrene or Methyl Methacrylate

All manipulations were carried out in a nitrogen filled dry box. A 10 mL vial was charged with appropriate amounts of macroinitiator 2 or 9, diphenyl ether, and styrene or methyl methacrylate. In a separate vial, correct amounts of CuCl or CuBr and bipyridine were added. The contents of both vials were then transferred to a Schlenk flask previously charged with a stir bar, generally giving a brown mixture. The flask was then capped tightly, covered with aluminum foil and removed from the dry box. After stirring in an oil bath set at an appropriate temperature for the desired amount of time, the flask was cooled to room temperature and poured into a large excess of MeOH causing the precipitation of a white polymer. The MeOH was decanted away and the polymer was washed several times with fresh MeOH and then dried under dynamic high vacuum. The SBS triblock copolymers were occasionally contaminated with a green residue which could easily be removed by passage through a short column of alumina (using THF as the eluent). The resulting polymer was then concentrated in vacuo and then dried under high vacuum. The resulting polymer was concentrated in vacuo and then characterized by $^1$H NMR, $^{13}$C NMR, and GPC. SBS triblock copolymers required the use of CS$_2$ as the solvent to avoid interference with residual protons in deuterated solvents. Data was thus acquired without a solvent lock and generally only one scan was taken to eliminate any errors related to differences in relaxation times.

Poly(styrene)-b-poly(butadiene)-b-poly(styrene) ("SBS")

Spectral data for a SBS triblock copolymer obtained from a 80:1 styrene/2 ratio: $^1$H NMR (CS$_2$) δ7.13–6.49 (br, 7.07H), 5.48–5.43 (br, 1H), 2.16–2.13 (br, 2.24H), 1.94–1.45 (br, 4.24H); $M_n$=12300, $X_n$(styrene)=95. GPC (relative to PS standards): $M_n$=10300, $M_w$=14900, PDI=1.45.

Poly(methyl methacrylate)-b-poly(butadiene)-b-poly (methyl methacrylate) ("MBM")

Spectral data for a MBM triblock copolymer obtained from a 80:1 MMA/9 ratio: $^1$H NMR (CDCl$_3$) δ5.43–5.37 (br,1H), 3.60 (br, 2.88H), 1.93–1.81 (br, 2H), 1.22–0.84 (br, 2.88H); $M_n$=11500, $X_n$(methyl methacrylate)=95. GPC (relative to PMMA standards): $M_n$=18100, $M_w$=27900, PDI=1.54.

Procedure for PBD Degradation

A 100 mL round bottom flask was charged with a stir bar, SBS triblock copolymer (500 mg, MW=12300 by $^1$H NMR), and o-dichlorobenzene (50 mL). To the solution was added H$_2$O$_2$ (30% w/w solution in H$_2$O, 10 mL) and OsO$_4$(3.93 mM solution in benzene, 1 mL). The mixture was then placed in an oil bath at 90° C. for 6 h at which point all of the H$_2$O evaporated leaving a colorless solution. The reaction was cooled to room temperature and poured into excess MeOH precipating a white polymer. The MeOH was decanted away and the polymer was washed several times with fresh MeOH and then placed under high vacuum to dry giving 228.5 mg of polystyrene. GPC (relative to PS standards): $M_n$=4900, $M_w$=6000, PDI=1.23. No PBD was observed by $^1$H NMR.

What is claimed is:

1. A method for preparing a triblock copolymer of the formula:

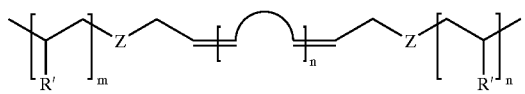

comprising:
(a) contacting a cycloalkene with a chain transfer agent of the formula:

Z—Y=Y—Z in the presence of a metal carbene metathesis catalyst to form a telechelic polymer; and
(b) contacting the telechelic polymer with an alkene of the formula

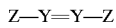

in the presence of an ATRP organometallic catalyst wherein n and m are integers; Z is an ATRP initiator and —Y=Y— is an alkenyl group; and, R' is selected from the group consisting of aryl, nitrile and C$_1$–C$_{20}$ carboxylate, wherein R' is substituted or unsubstituted.

2. The method of claim 1 wherein the metathesis catalyst is of the formula:

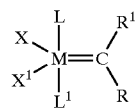

wherein:
M is ruthenium or osmium;
X and X$^1$ are either the same or different and are any anionic ligand;
L and L$^1$ are either the same or different and are any neutral electron donor;
R and R$^1$ are either the same or different and are each independently hydrogen or a substituent selected from the group consisting of C$_1$–C$_{20}$ alkyl, C$_2$–C$_{20}$ alkenyl, C$_2$–C$_{20}$ alkynyl, aryl, C$_1$–C$_{20}$ carboxylate, C$_1$–C$_{20}$ alkoxy, C$_2$–C$_{20}$ alkenyloxy, C$_2$–C$_{20}$ alkynyloxy, aryloxy, C$_2$–C$_{20}$ alkoxycarbonyl, C$_1$–C$_{20}$ alkylthio, C$_1$–C$_{20}$ alkylsulfonyl and C$_1$–C$_{20}$ alkylsulfinyl, wherein each of the substituents is substituted or unsubstituted.

3. The method of claim 2 wherein at least one of R and $R^1$ is substituted with one or more substituted or unsubstituted moieties selected from the group consisting of $C_1$–$C_{10}$ alkyl, $C_1$–$C_{10}$ alkoxy, and aryl.

4. The method of claim 3 wherein the moiety is substituted with one or more groups selected from the group consisting of halogen, $C_1$–$C_5$ alkyl, $C_1$–$C_5$ alkoxy.

5. The method of claim 2 wherein at least one of R and $R^1$ is functionalized with a moiety selected from the group consisting of hydroxyl, thiol, thioether, ketone, aldehyde, ester, ether, amine, imine, amide, nitro, carboxylic acid, disulfide, carbonate, isocyanate, carbodiimide, carboalkoxy, carbamate, and halogen.

6. The method of claim 2 wherein R is hydrogen and $R^1$ is selected from the group consisting of $C_1$–$C_{20}$ alkyl, $C_2$–$C_{20}$ alkenyl, aryl, unsubstituted phenyl, substituted phenyl, unsubstituted vinyl, and substituted vinyl; and wherein the substituted phenyl and substituted vinyl are each independently substituted with one or more groups selected from the group consisting of $C_1$–$C_5$ alkyl, $C_1$–$C_5$ alkoxy, phenyl, hydroxyl, thiol, ketone, aldehyde, ester, ether, amine, imine, amide, nitro, carboxylic acid, disulfide, carbonate, isocyanate, carbodiimide, carboalkoxy, and halogen.

7. The method of claim 2 wherein L and $L^1$ are each independently selected from the group consisting of phosphine, sulfonated phosphine, phosphite, phosphinite, phosphonite, arsine, stibine, ether, amine, amide, imine, sulfoxide, carboxyl, nitrosyl, pyridine, and thioether.

8. The method of claim 2 wherein L and $L^1$ are each a phosphine of the formula $PR^3R^4R^5$ wherein $R^3$, $R^4$, and $R^5$ are each independently selected from the group consisting of aryl and $C_1$–$C_{10}$ alkyl.

9. The method of claim 8 wherein $R^3$, $R^4$, and $R^5$ are each independently selected from the group consisting of primary alkyl, secondary alkyl, and cycloalkyl.

10. The method of claim 8 wherein L and $L^1$ are each independently selected from the group consisting of P(cyclohexyl)$_3$, P(cyclopentyl)$_3$, P(isopropyl)$_3$, and P(phenyl)$_3$.

11. The method of claim 2 wherein X and $X^1$ are each independently selected from the group consisting of hydrogen, halogen, substituted moiety and unsubstituted moiety, wherein the moiety is selected from the group consisting of $C_1$–$C_{20}$ alkyl, aryl, $C_1$–$C_{20}$ alkoxide, aryloxide, $C_3$–$C_{20}$ alkyidiketonate, aryldiketonate, $C_1$–$C_{20}$ carboxylate, arylsulfonate, $C_1$–$C_{20}$ alkylsulfonate, $C_1$–$C_{20}$ alkylthio, $C_1$–$C_{20}$ alkylsulfonyl, and $C_1$–$C_{20}$ alkylsulfinyl, and wherein the moiety substitution is selected from the group consisting of $C_1$–$C_{10}$ alkyl, $C_1$–$C_{10}$ alkoxy, and aryl.

12. The method of claim 2 wherein X and $X^1$ are each independently selected from the group consisting of halide, benzoate, $C_1$–$C_5$ carboxylate, $C_1$–$C_5$ alkyl, phenoxy, $C_1$–$C_5$ alkoxy, $C_1$–$C_5$ alkylthio, aryl, and $C_1$–$C_5$ alkyl sulfonate.

13. The method of claim 2 wherein X and $X^1$ are each independently selected from the group consisting of halide, $CF_3CO_2$, $CH_3CO_2$, $CFH_2CO_2$, $(CH_3)_3CO$, $(CF_3)_2(CH_3)CO$, $(CF_3)(CH_3)_2CO$, PhO, MeO, EtO, tosylate, mesylate, and trifluoromethanesulfonate.

14. The method of claim 1 wherein the cycloalkene is selected from the group consisting of norbornene, norbornadiene, cyclopentene, dicyclopentadiene, cyclooctene, 7-oxanorbornene, 7-oxanorbornadiene, cyclodocene, 1,3-cyclooctadiene, 1,5-cyclooctadiene, and 1,3-cycloheptadiene, wherein the cycloalkene is substituted or unsubstituted.

15. The method of claim 1 wherein the cycloalkene is 1,5-cyclo-octadiene.

16. The method of claim 1 wherein Z is selected from the group consisting of chloride, bromide, allyl chloride, allyl bromide, 2-chloro isobutyrate, 2-bromo isobutyrate, 2-chloro proprionate, 2-bromo proprionate, 2-chloro acetate, 2-bromo acetate, benzyl chloride, benzyl bromide, $C_1$–$C_{20}$ alkyl benzyl chloride, $C_1$–$C_{20}$ alkyl benzyl bromide, toluenesulfonyl chloride, toluenesulfonyl bromide, trichloromethyl, tribromomethyl, dichloromethyl, and dibromomethyl, wherein Z is substituted or unsubstituted.

17. The method of claim 16 wherein Z is substituted with a moiety selected from the group consisting of $C_1$–$C_{10}$ alkyl, $C_1$–$C_{10}$ alkoxy, and aryl, wherein the moiety is substituted or unsubstituted.

18. The method of claim 17 wherein the moiety is substituted with one or more groups selected from the group consisting of halogen, $C_1$–$C_5$ alkyl, $C_1$–$C_5$ alkoxy, and phenyl.

19. The method of claim 1 wherein R' is substituted with a substituent selected from the group consisting of $C_1$–$C_5$ alkyl, $C_1$–$C_5$ alkoxy, and aryl, wherein the substituent is substituted or unsubstituted.

20. The method of claim 19 wherein the substituent is substituted with a moiety is selected from the group consisting of halogen, $C_1$–$C_5$ alkyl, and $C_1$–$C_5$ alkoxy.

21. The method of claim 1 wherein the alkene is functionalized with a group selected from the group consisting of hydroxyl, thiol, thioether, ketone, aldehyde, ester, ether, amine, imine, amide, nitro, carboxylic acid, disulfide, carbonate, isocyanate, carbodiimide, carboalkoxy, carbamate, and halogen.

22. The method of claim 1 wherein the alkene is selected from the group consisting of styrene, methyl methacrylate, n-butyl acrylate, methyl acrylate, 2-ethylhexyl acrylate, acrylonitrile, 4-vinylpyridine and glycidyl acrylate.

23. The method of claim 1 wherein the ATRP catalyst is of the formula $MX_pL_q$ wherein M is selected from the group consisting of iron, ruthenium, nickel, and copper; X is bromide or chloride; and L is selected from the group consisting of phosphine, sulfonated phosphine, phosphite, phosphinite, phosphonite, arsine, stibine, ether, amine, amide, imine, sulfoxide, carboxyl, nitrosyl, pyridine, and thioether; and wherein p and q are integers.

24. The method of claim 1 wherein the ATRP catalyst is selected from the group consisting of CuCl/2,2'-bipyridine, CuBr/2,2'-bipyridine, CuCl/4-4'-di-n-heptyl-2,2'-bipyridine and CuBr/4-4'-di-n-heptyl-2,2'-bipyridine.

25. The method of claim 1 wherein the formation of the triblock copolymers occurs in one pot.

26. A method for preparing a triblock copolymer of the formula

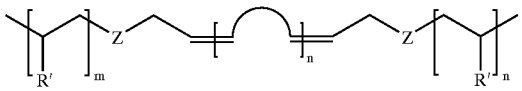

comprising:

(a) contacting a cycloalkene with a chain transfer agent of the formula:

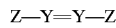

in the presence of a metal carbene metathesis catalyst to form a telechelic polymer; and (b) contacting the telechelic polymer with an alkene of the formula

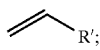

wherein
  n and m are integers;
  Z is an ATRP initiator;
  —Y=Y— is an alkenyl group; and
  R' is selected from the group consisting of aryl, nitrile and $C_1$–$C_{20}$ carboxylate, wherein R' is substituted or unsubstituted; and
  wherein the cycloalkene is 1,5-cyclooctadiene, Z is allyl chloride or 2-bromoisobutyrate and the alkene is styrene or methyl methacrylate.

27. A method for preparing a copolymer of the formula:

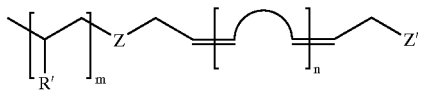

comprising:
  (a) contacting a cycloalkene with a chain transfer agent of the formula:

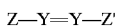

in the presence of a metal carbene metathesis catalyst to form a telechelic polymer; and
  (b) contacting the telechelic polymer with an alkene of the formula

in the presence of an ATRP organometallic catalyst
wherein
  n and m are integers;
  Z is an ATRP initiator;
  Z' is hydrogen or a moiety selected from the group consisting of $C_1$–$C_{20}$ alkyl, $C_2$–$C_{20}$ alkenyl, $C_2$–$C_{20}$ alkynyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkoxythio, $C_1$–$C_{20}$ alkylsulfonyl, $C_1$–$C_{20}$ alkylsulfinyl, wherein Z' is substituted or unsubstituted; and
  R' selected from the group consisting of aryl, nitrile and $C_1$–$C_{20}$ carboxylate,
  wherein R' is substituted or unsubstituted.

28. A method for preparing a triblock copolymer of the formula:

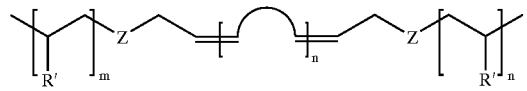

comprising:
  (a) contacting 1,5-cyclooctadiene with a chain transfer agent of the formula:

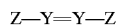

in the presence of a metal carbene metathesis catalyst to form a telechelic polymer; and
  (c) contacting the telechelic polymer with an alkene of the formula

in the presence of an ATRP organometallic catalyst
wherein n and m are integers; Z is allyl chloride or 2-bromoisobutyrate and —Y=Y— is an alkenyl group; the ATRP organometallic catalyst is CuCl/2,2'-bipyridine or CuBr/2,2'-bipyridine and, R' is selected from the group consisting of aryl, nitrile and $C_1$–$C_{20}$ carboxylate, wherein R' is substituted or unsubstituted.

29. A method for preparing an SBS triblock copolymer of the formula: comprising:
  (a) contacting 1,5-cyclooctadiene with a chain transfer agent of the formula:

in the presence of a ruthenium carbene metathesis catalyst to form a telechelic polymer; and
  (b) contacting the telechelic polymer with styrene in the presence of CuBr/2,2'-bipyridine.
wherein n and m are integers; Z is chloride and —Y=Y— is an alkenyl group.

* * * * *